(12) United States Patent
Lee et al.

(10) Patent No.: US 7,811,547 B2
(45) Date of Patent: Oct. 12, 2010

(54) METHOD FOR PREPARATION OF UNIFORMLY ORIENTED ZEOLITE SUPERCRYSTALS USING UNIFORMLY ALIGNED TEMPLATE

(75) Inventors: Jin-Seok Lee, Seoul (KR); Yun-Jo Lee, Seoul (KR); Eunju Lee Tae, Goyang-si (KR); Yong Soo Park, Seoul (KR); Kyung Byung Yoon, Seoul (KR)

(73) Assignee: Industry University Cooperation Foundation Sogang University, Seoul (KR)

( * ) Notice: Subject to any disclaimer, the term of this patent is extended or adjusted under 35 U.S.C. 154(b) by 1199 days.

(21) Appl. No.: 10/566,603

(22) PCT Filed: Jan. 13, 2004

(86) PCT No.: PCT/KR2004/000045

§ 371 (c)(1),
(2), (4) Date: Jan. 31, 2006

(87) PCT Pub. No.: WO2005/012177

PCT Pub. Date: Feb. 10, 2005

(65) Prior Publication Data

US 2006/0199724 A1    Sep. 7, 2006

(30) Foreign Application Priority Data

Aug. 5, 2003    (KR)    ............... 10-2003-0054157

(51) Int. Cl.
*C01B 39/00*    (2006.01)
*C01B 39/04*    (2006.01)
*C01B 39/02*    (2006.01)
*B01J 29/04*    (2006.01)

(52) U.S. Cl. ............... 423/702; 423/700; 423/701; 502/60

(58) Field of Classification Search ......... 423/700–718; 502/60

See application file for complete search history.

(56) References Cited

U.S. PATENT DOCUMENTS

2002/0034830 A1    3/2002    Earhart et al. ............... 436/518

FOREIGN PATENT DOCUMENTS

DE         4240821         6/1994
WO    WO 01/96106 A1 *    12/2001

OTHER PUBLICATIONS

Feng, S. and T. Bein, Growth of oriented molecular sieve crystals on organophosphonate films, 1994, Nature, vol. 368, pp. 834-836.*

(Continued)

*Primary Examiner*—Melvin C Mayes
*Assistant Examiner*—Kevin M Johnson
(74) *Attorney, Agent, or Firm*—The Nath Law Group; Joshua B. Goldberg; Mih Suhn Koh

(57) ABSTRACT

The present invention relates to a method for preparing a uniformly aligned zeolite supercrystal, which comprises growing a crystal of a zeolite or zeotype material in a uniformly aligned template, whereby said uniformly aligned zeolite supercrystal is prepared, and a uniformly aligned zeolite supercrystal. The uniformly aligned zeolite supercrystal of this invention would be anticipated to maximize its applicability by overcoming the shortcomings of zeolites with random orientation.

3 Claims, 21 Drawing Sheets

OTHER PUBLICATIONS

Lee, Goo Soo et al., Layer-by-Layer Assembly of Zeolite Crystals on Glass with Polyelectrolytes as Ionic Linkers, 2001, J. Am. Chem. Soc., 123, pp. 9769-9779.*

Lee, Yun-Jo et al., Synthersis of Large Monolithic Zeolite Foams with Variable Macropore Architectures, 2001, Adv. Mater., 13, No. 16, pp. 1259-1263.*

Baldo, Marc et al., Organic Vapor Phase Deposition, 1998, Adv. Mater., 10, No. 18, pp. 1505-1514.*

Raukola, J., A new technology to manufacture polypropylene foam sheet and biaxially oriented foam film, 1998, VTT Publications, 361, pp. 1-101.*

U.S. Appl. No. 10/560,964, filed Jun. 19, 2003, Yoon et al.

* cited by examiner

METHOD FOR PREPARATION OF UNIFORMLY ORIENTED ZEOLITE SUPERCRYSTALS USING UNIFORMLY ALIGNED TEMPLATE

BACKGROUND OF THE INVENTION

1. Field of the Invention

The present invention relates to a method for preparing a uniformly aligned zeolite supercrystal, a method for preparing a uniformly aligned polymer film and mass and a uniformly aligned zeolite supercrystal.

2. Description of the Related Art

Zeolite is a generic name of crystalline aluminosilicate, which constitutes the pore skeleton of zeolite molecules and bears an anionic charge for each aluminum atom. Cations for compensating such anion charges are present within the very fine pore space and the remaining pore space is usually filled with water. The 3-dimensional pore structure, shape and size of the zeolite molecules varies depending on the type of zeolites, and the pore diameter is usually corresponding to the size of molecules. Therefore, based on the type of zeolites, zeolite has the size selectivity or shape selectivity for a molecule entering into the pore, and thus, zeolite is called as a molecular sieve.

Meanwhile, there are many known zeotype molecular sieves wherein a part or all of silicon (Si) and/or aluminum (Al) atoms constituting the structural skeleton of zeolite molecule are replaced with other elements. For example, a porous silicalite-typed molecular sieve in which aluminum atoms are completely eliminated, an alpo ($AlPO_4$)-typed molecular sieve in which silicon atoms are replaced with phosphorous atoms, and other molecular sieve or zeotype material wherein skeleton metal atoms are partially replaced with various metal atom such as Ti, Mn, Co, Fe and Zn have been developed and widely used. The materials described above are derived from zeolites and thus generally called as zeolites in the art, while they not belong to zeolites in terms of mineralogy. Accordingly, the term "zeolite" used herein refers to a broad-sensed zeolite including zeotype molecular sieves described previously.

Zeolites are widely used in the field of households and various industries serving as a catalyst for cracking petroleum, adsorbent, water-absorbing agent, gas-purifying agent, additives for detergent and soil improving agent. In particular, zeolites are very useful as an ion exchanger to eliminate heavy metals, radioisotopes and diverse ionic pigments in industrial waste water.

In addition, zeolites have been suggested to be applicable as innovative materials because of their nanoporous structure (1). For example, zeolites have been reported to be applicable as a host for a three-dimensional memory material (2), a light energy storage device (3-5), a nanoelectrode (6), a quantum beam or point of semiconductor (7), a molecular circuit (8), a photosensitive device (9), a luminant (10), a nonlinear optical material (11) or a laser luminant.

In order for zeolites to find application as innovative materials, it is necessary to develop the technology to organize the zeolite crystals with a nanometer or micrometer size into uniformly aligned, two- and three-dimensional compact structures (zeolite supercrystals). However, there have been no suggestions to report the technology for preparing a uniformly aligned zeolite supercrystal (13).

The present inventors have explored methods for linking zeolite microcrystals through chemical linkages in a two-dimensional or three-dimensional manner (14-16; Korean Pat. No. 0335966; WO01/96106). However, the approaches have not given us the ability to control the orientation of the zeolite crystals with respect to the substrate plane due to the intrinsic propensity of the microcrystals to align in such orientations that lead to maximum face-to-face contacts between the crystals and the substrates.

Throughout this application, various patents and publications are referenced and citations are provided in parentheses. The disclosure of these patents and publications in their entities are hereby incorporated by references into this application in order to more fully describe this invention and the state of the art to which this invention pertains.

SUMMARY OF THE INVENTION

The present inventors have made intensive researches to meet the long felt need of the art described previously, and a result, found that crystals of a zeolite or zeotype material have been grown in a uniformly aligned template to produce a uniformly aligned zeolite supercrystal.

Accordingly, it is an object of this invention to provide a method for preparing a uniformly aligned zeolite supercrystal.

It is another object of this invention to provide a method for preparing a uniformly aligned polymer film.

It is still another object of this invention to provide a method preparing a uniformly aligned three-dimensional polymer mass.

It is further object of this invention to provide a uniformly aligned zeolite supercrystal.

Other objects and advantages of the present invention will become apparent from the detailed description to follow and together with the appended claims and drawings.

BRIEF DESCRIPTION OF THE DRAWINGS

FIG. 1C is the apparatus executing chemical vapor deposition in which each monomer (i.e., reactant) is injected into a reactor with nitrogen or argon carrier. FIG. 1D show the exterior automatic controller.

FIGS. 8A-8B represent SEM images of silicalite-1 supercrystal aligned with c-axis perpendicular to the substrate plane; FIG. 8C represents the general crystals of silicalite-1 grown on a bare glass plate with b-axis perpendicular to the substrate plane (b-axis growth); FIG. 8D represents the x-ray diffraction (XRD) analysis results (23) of c- and b-axes crystal growth and the drawings in the top of the panel indicates the orientations of silicalite-1 crystals, their degree of tilting and the corresponding percentages. FIG. 8E shows the SEM image indicating the change of crystal shape by altering the composition ratio of the synthesis gel for silicalite-1; FIG. 8F is SEM image showing the multi-layered silicalite-1 supercrystals uniformly oriented.

FIG. 10A is SEM image showing that the crystals are aligned with the a-axis perpendicular to substrate plane; FIG. 10B represents the XRD analysis results (23) of the b-axis crystal growth (FIG. 8C) and the c-axis crystal growth (FIG. 10A), demonstrating that silicalite-1 crystals grown from uniformly aligned polyurethane film containing ester groups are aligned with a-axis perpendicular to substrate plane. FIG. 10C illustratively represents the three-dimensional connections of micropores (the orientations of the straight and sinusoidal channels) in silicalite-1 crystals in a-axis orientation.

FIGS. 11B-11D are SEM images of the cross sections of the intermediate polymers.

DETAILED DESCRIPTION OF THIS INVENTION

Figure 1A:
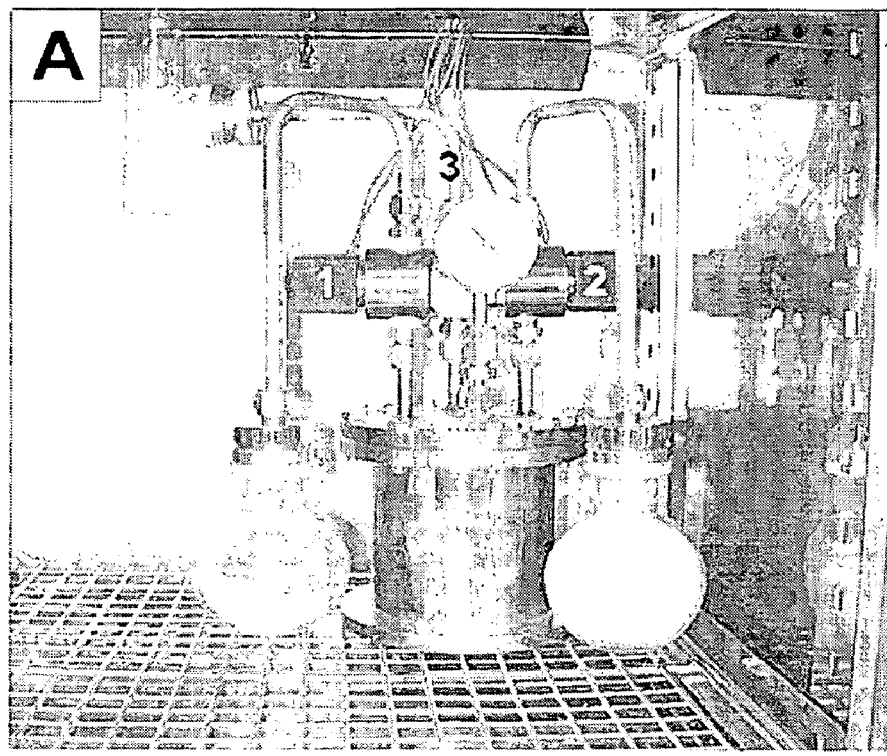
FIGS. 1A-1D represent the photo (1A) showing the setup for carrying out the present method and the illustrative drawing (1B). The solenoid valves (numbered 1, 2 and 3) are controlled using the exterior automatic controller.
Figure 1B:
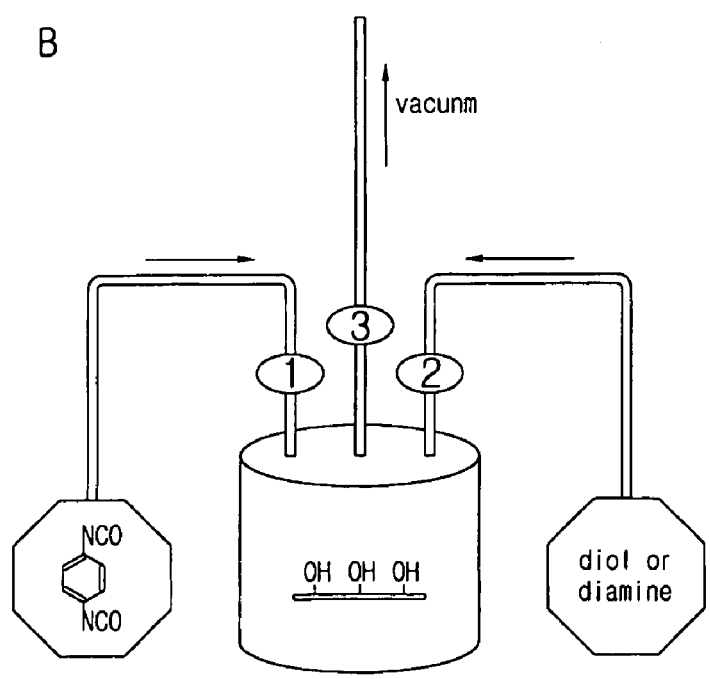
Figure 1C:
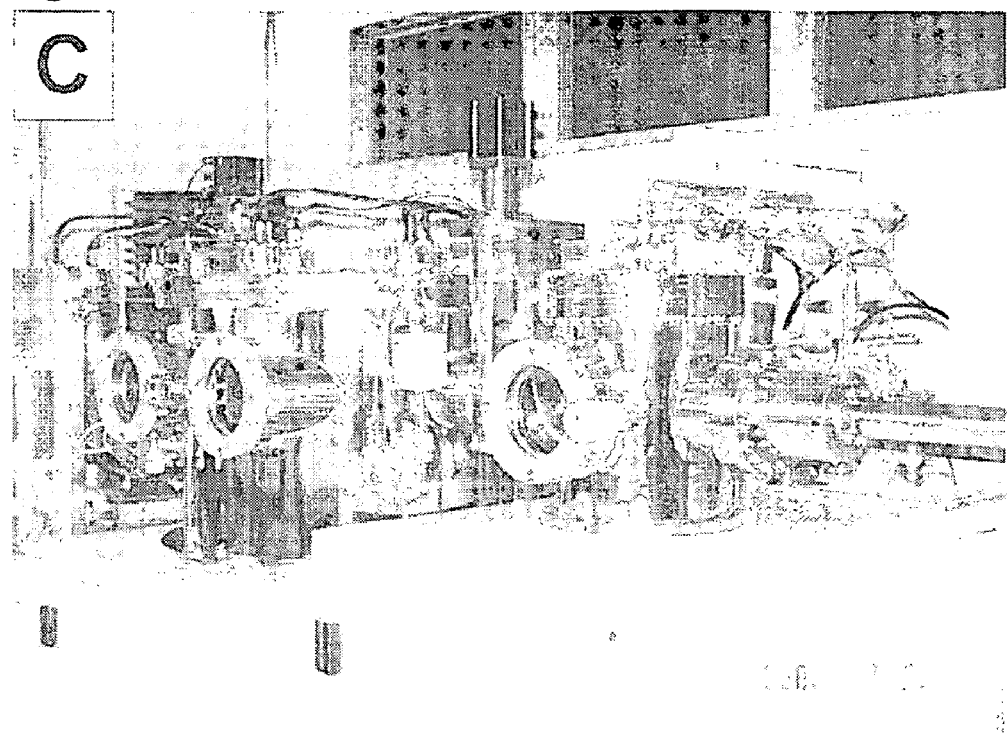
Figure 1D:
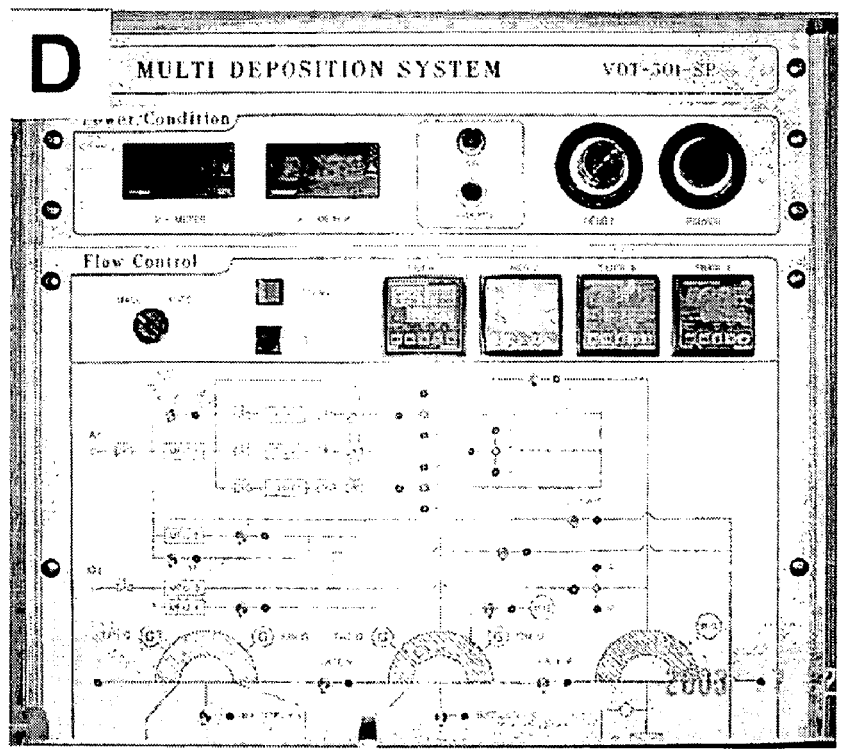
Figure 2A:
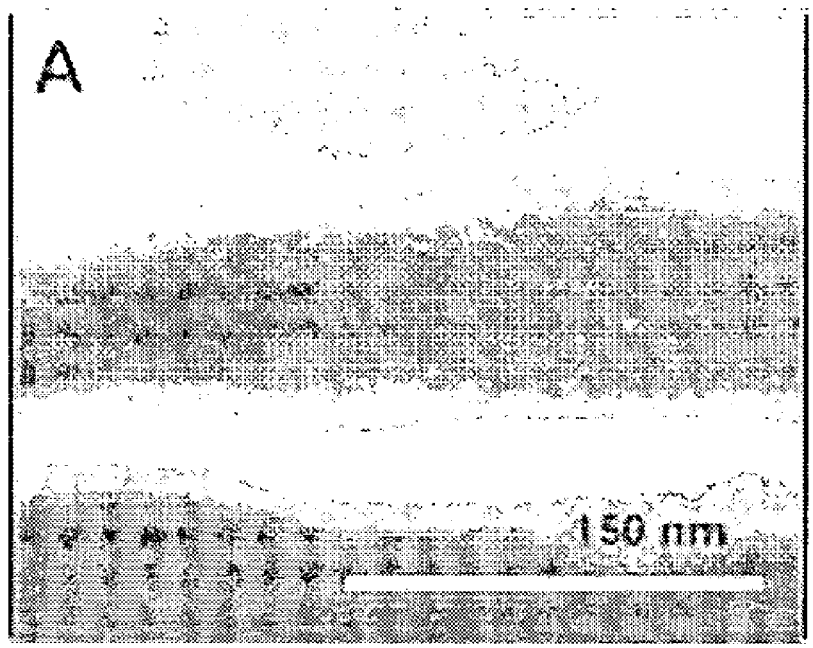
FIGS. 2A-2D represent Scanning electron microscope (SEM) images showing the cross sections of uniformly aligned polyurethane films prepared in Example I and a graph showing their thickness.
Figure 2B:
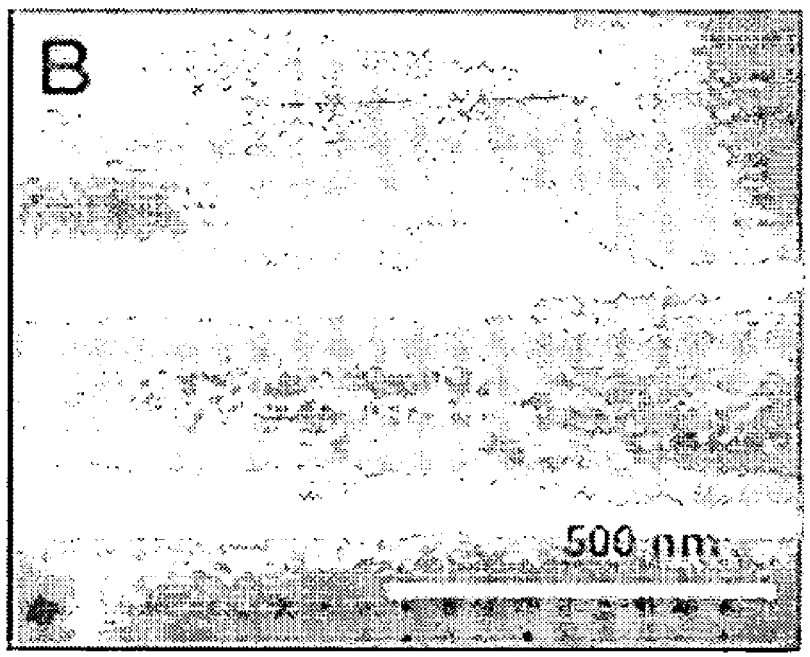
Figure 2C:
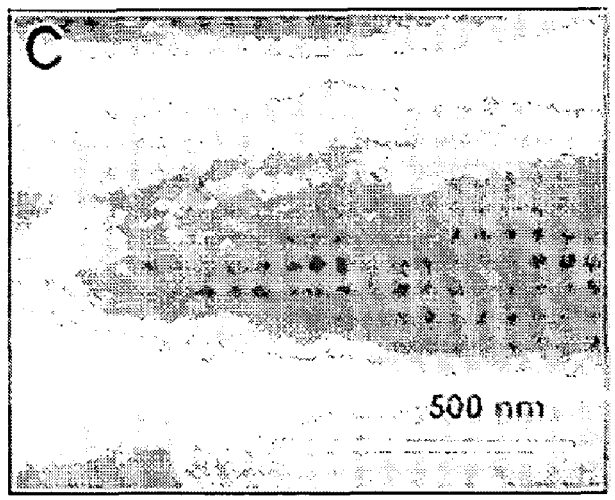
Figure 2D:
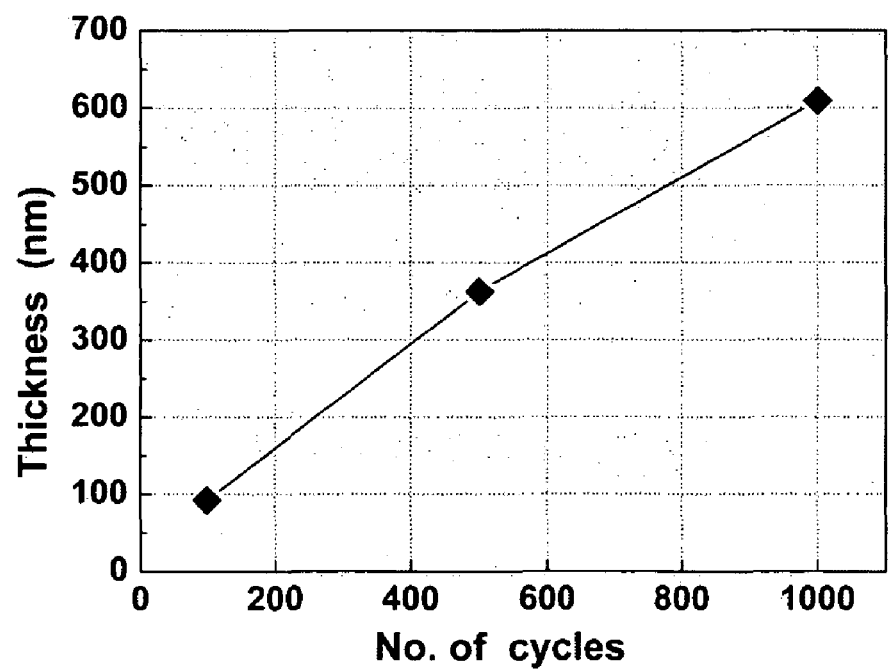

In one aspect of this invention, there is provided a method for preparing a uniformly aligned zeolite supercrystal, which comprises growing a crystal of a zeolite or zeotype material in a uniformly aligned template, whereby the uniformly aligned zeolite supercrystal is prepared.

The uniformly aligned zeolite supercrystal has never been manufactured by anyone and is firstly developed by the present inventors. The term "uniformly oriented zeolite supercrystal" or "uniformly aligned zeolite supercrystal" used herein refers to a supercrystal formed by zeolite crystals that are prepared with controlling their growth direction to have one orientation and therefore have substantially one orientation. As a result, the supercrystal formed by zeolite crystals having substantially one orientation has one orientation. The term "supercrystal" used herein refers to an organized or assembled structure of crystals in two- or three-dimension. There is no intended distinction between the terms "supercrystal" and "array" with reference to crystal, and these terms will be used interchangeably. The term "zeolite supercrystal" means an organized or assembled structure of zeolite crystals in two- or three-dimension.

Following long-standing patent law convention, the terms "a" and "an" mean "one or more" when used in this application, including the claims.

The term "template" in conjunction with crystal used herein refers to a matrix for generating crystals of zeolite or zeotype material. The template becomes to be disrupted during the synthesis of zeolite or zeotype material and disappears completely or substantially after the synthesis of zeolite or zeotype material. The spaces occupied by the template and the adjacent area thereof will be occupied by zeolite or zeotype material. Therefore, the template useful in this invention may comprise any polymer or crystal of organic or organometallic compound to be disrupted under certain conditions.

The term "uniformly aligned template" and "uniformly oriented template" refers to a template of which molecules are aligned or oriented in one orientation.

According to a preferred embodiment, the template is a polymer film, a 3-dimensional polymer mass, or a crystal of organic or organometallic compound. More preferably, the template is a polymer film or 3-dimensional polymer mass capable of releasing an amine group (including organic amine or ammonium) under an acidic or alkaline condition.

The polymeric template suitable in this invention is exemplified as follows:

(i) polymers of polyurethane type, for example, prepared using a polyol or polyhydric alcohol having two or more alcohol groups and a polyvalent isocyanate having two or more isocyante groups;

(ii) polymers of polyurea type, for example, prepared using a polyamine or polyvalent amine having two or more amine groups and a polyvalent isocyanate having two or more isocyante groups;

(iii) polymers (e.g., polyurethane or polyurea) of which main chain bears internal ester groups;

(iv) polymers of polyamide type, for example, nylon, protein and silk;

(v) aromatic or aliphatic polyimides, for example, prepared by condensing a dianhydride and a diamine;

(vi) polymers of polyamideimide type;

(vii) polymers of epoxy resin type in which amine or its derivatives such as urea, melamine and guanamine constitutes the skeleton of the polymer; and, (viii) other polymers which can be hydrolyzed by an acid or base to release organic amino groups.

The crystal of organic or organometallic compound suitable in this invention includes, but not limited to, the crystal of organic or organometallic compound having functional groups of urethane, urea, ester, amide, amine or imide.

The uniformly aligned polymer film and 3-dimensional polymer mass are prepared according to a unique method developed by the present inventors. Accordingly, in another aspect of this invention, there is provided a method for preparing a uniformly aligned polymer film or 3-dimensional polymer mass.

The method for preparing a uniformly aligned polymer film comprises the steps of: (a) injecting a vapor of a first reactant into a reactor containing a substrate to form a covalent bond between a functional group of the first reactant and a functional group on the substrate; (b) injecting a vapor of a second reactant into the reactor to form a covalent bond between a functional group of the second reactant and a functional group of the first reactant covalently linked to the functional group on the substrate; (c) when three or more reactants are used, injecting a vapor of a following reactant into the reactor to form a covalent bond between a functional group of the following reactant and a functional group of a previous reactant; and (d) cycling the steps (a)-(c), wherein a functional group of the first reactant is covalently linked to a functional group of a final reactant.

The method for preparing a uniformly aligned three-dimensional polymer mass comprises the steps of: (a) injecting a vapor of a first reactant into a reactor containing a substrate to form a covalent bond between a functional group of the first reactant and a functional group on the substrate; (b) injecting a vapor of a second reactant into the reactor to form a covalent bond between a functional group of the second reactant and a functional group of the first reactant covalently linked to the functional group on the substrate; (c) when three or more reactants are used, injecting a vapor of a following reactant into the reactor to form a covalent bond between a functional group of the following reactant and a functional group of a previous reactant; (d) cycling the steps (a)-(c) to form a uniformly aligned polymer film, wherein a functional group of the first reactant is covalently linked to a functional group of a final reactant; and (e) removing the substrate to produce the uniformly aligned polymer mass.

The present method is carried out with modifying a chemical vapor deposition process (31).

The term "substrate" used herein refers to a material capable of supporting other material that is covalently or non-covalently attached to the substrate. Preferably, the substrate is covalently attached to the supported material.

The exemplified substrate useful in this invention includes:

(i) materials containing hydroxyl groups on their surface, for example, oxides or mixed oxides of metals and non-metals such as silicon, aluminum, titanium, tin and indium, which can be used alone or in a mixture, for example, glass, quartz, mica, ITO glass (glass deposited with indium tin oxide), tin oxide ($SnO_2$), and other conductive glass, silica, porous silica, alumina, porous alumina, titanium dioxide, porous titanium dioxide, silicon wafer and the like;

(ii) metals capable of reacting with a thiol or amino group, such as gold, platinum, silver and copper;

(iii) polymers having various functional groups on their surface, such as PVC, a Merrifield peptide resin and the like;

(iv) semiconductive materials such as selenium-zinc (ZnSe), gallium-arsenic (GaAs) and indium-phosphor (InP);

(v) natural materials of high molecular weight, which carry hydroxyl groups on their surface such as cellulose, starch (e.g., amylose and amylopectin) and lignin; and (vi) natural or synthetic zeolite or zeotype molecules.

It is preferred that the substrate is selected from the group consisting of glass, quartz, mica, ITO glass or electrode, silicon wafer, metal oxide, porous oxide, porous alumina and porous stainless steel.

In the present method, the reactants for preparing uniformly aligned templates may not be restricted if they are capable of generating a polymeric template.

It is preferable to select suitable reactants for preparing uniformly aligned templates. The suitable reactants generally have three moieties, a central moiety and two end moieties. They are represented by the following general formula I:

wherein, E represents an end moiety containing at least one functional group and C represents a central moiety.

Referring to the formulae of 1,4-phenylene diisocyanate (PDI) and 2-butyne-1,4-diol (BDO), reactants for preparing polyurethane film described in Example I, the structure of reactants will be described in more detail.

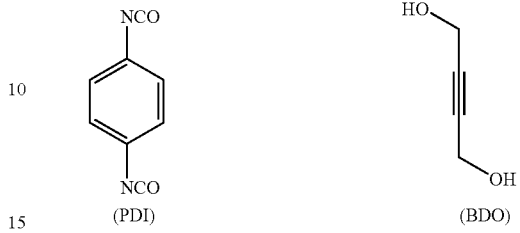

The end moieties are a portion to react with a functional group of substrate or a functional group of the end moiety in other reactants. The end moiety is also characterized by its terminal position. With regard to PDI and BDO, the corresponding end moiety is —NCO and —$CH_2OH$ groups, respectively. Most preferably, the functional group of one end moiety is opposite to that of the other end moiety. For example, p-phenylene diisocyanate (i.e., 1,4-phenylene diisocyanate) is advantageous over m-phenylene diisocyanate (1,3-phenylene diisocyanate) and o-phenylene diisocyanate (1,2-phenylene diisocyanate).

The functional group of the end moieties forms a covalent bond by reacting with a functional group of substrate or a functional group of the end moiety in other reactants. With regard to PDI, one of the cyanate groups forms a covalent bond by reacting a functional group of substrate in the first reaction cycle. The other cyanate group forms a covalent bond by reaction a functional group of other substrate, e.g., BDO.

According to a preferred embodiment, the reactants have at least 2 functional groups, more preferably, 2-8 functional groups, still more preferably, 2-4 functional groups and most preferably, 2 functional groups, i.e., difunctionality. Specifically, at least one of the functional groups is placed at one end moiety of the reactant and at least one of the functional groups is placed at the other moiety of the reactant. For example, in the reactant having 4 functional groups, 2 functional groups may be positioned in one end moiety and other 2 functional groups may be positioned in the other end moiety.

The functional groups are the same or different in a reactant molecule. That is, the reactant has a homo- or hetero-functionality. If the template is prepared with two reactants, it is preferred that the reactants have homo-functionality; however, if the template is prepared with at least three reactants, it is preferred that the reactants have hetero-functionality.

The functional group of end moieties includes any one having potential to take part in a chemical reaction with desired reactivity. Exemplified functional group includes hydroxyl, amino, amido, cyano, carbonyl, alkoxycarbonyl, carboxyl, nitro, formyl, alkyl, sulfo and mercapto, but not limited to.

According to a preferred embodiment, the reactant has a rigid molecular structure in the central moiety of its molecular structure. The rigid molecular structure permits to restrict the rotation of the adjacent bonds to the functional group, thereby contributing to the generation of a uniformly aligned template. Preferably, the rigid molecular structure is an aromatic ring structure or a double bond. If the reactant has the aromatic ring structure in its central moiety, the aromatic rings inter-layered may overlap geometrically and electronically to result in the stacking phenomenon, contributing to the uniform alignment of template.

Meanwhile, 1,4-phenylene diamine used in Example V and terephthalic acid bis-(2-hydroxy ethyl)ester (TBE) used in Example VI meet the above-described requirements to reactants used in this invention.

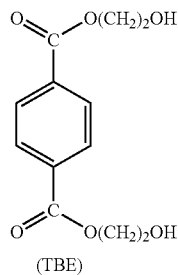
(TBE)

Referring to a uniformly aligned polyurethane film, the present method will be described in more detail hereunder:

A substrate (e.g., silicon wafer or glass) is placed in a reaction chamber depicted in FIG. 1 and the first reactor, 1,4-phenylene diisocyanate and the second reactor, 2-butyne-1,4-diol are charged into two glass flasks, respectively. Prior to the reaction, the chamber and glass flasks are kept under vacuum, and each solenoid valve connected to glass flasks is closed, followed by elevating the temperature of an oven in which the chamber is placed. At this time, the suitable temperature of the oven varies depending on the type of monomers of polymer and in general, is maintained at a temperature higher 30° C. than a vaporizing temperature of monomers under vacuum.

Then, a solenoid valve of the left flask is opened to spray 1,4-phenylene diisocyanate (PDI), allowing the urethane reaction (—NH—CO—O—) between the introduced vapor and the hydroxyl groups on the substrate. The non-reacted, excess 1,4-phenylene diisocyanate is removed from the chamber by opening the vacuum valve and a solenoid valve of the right flask is opened to spray 2-butyne-1,4-diol (BDO). After the spraying, all the valves are closed to allow the urethane reaction (—NH—CO—O—) between the introduced vapor and the isocyanate groups (—N=C=O) of PDI linked onto the substrate and the non-reacted, excess BDO is removed from the chamber.

The serial procedure described above is defined as one layer. With operating all the three valves by the automatic controller, the uniformly aligned polyurethane film with desirable layers is prepared.

It is generally that the pressure for reaction is controlled to be vacuum, preferably, $10^{-2}$-$10^{-7}$ torr. It is generally that the temperature for reaction be adjusted to be higher than vaporizing temperatures of reactants under vacuum. Preferably, the temperature is controlled to be higher 20° C., more preferably, 30° C. than vaporizing temperatures of reactants.

The removal of non-reacted, excess reactants permits to prevent the formation of heterogeneous films due to their physical adsorption.

The flaks containing reactants may be made of glass or metal. The introduction of reactants into a reaction chamber may be carried out alone or with carrier gas (e.g., nitrogen and argon). The carrier gas facilitates the introduction of reactant gases into a reaction chamber (see, FIGS. 1(C), 1(D)).

For obtaining a three-dimensional polymer mass, the polymer layer deposited on the substrate could be separated with a sharp knife. Also, the substrate with deposited polymer layer is immersed and degraded in a suitable solution (HF solution) to give a polymer mass.

Meanwhile, as a useful template, the uniformly aligned crystals of organic or organometallic compound can be prepared according to a conventional recrystallization process.

The crystals of zeolite or zeotype material is grown in the uniformly aligned template prepared above, so that uniformly aligned multi-crystal arrays can be prepared.

According to a preferred embodiment, the growth of crystals of zeolite or zeotype material is accomplished by immersing the uniformly oriented template in a solution, gel or sol of a precursor of zeolite or zeotype material and aging the resultant at a suitable temperature for a period of time such that all or almost all of the template can be replaced with zeolite or zeotype materials. It is more preferred that the immersion be carried out under alkaline or acidic condition.

Therefore, the present method for preparing a uniformly aligned zeolite supercrystal comprises the steps of (a) immersing a uniformly aligned template in a solution, gel or sol of a precursor of zeolite or zeotype material under an alkaline or acidic (preferably, alkaline) condition; and (b) growing a crystal of a zeolite or zeotype material.

Zeolites or zeotype materials are usually synthesized and crystallized under alkaline conditions, and mesoporous silicas such as MCM, SBA, MSU and KIT are synthesized under alkaline or acidic conditions.

It is advantageous that the step of growing a crystal of a zeolite or zeotype material is performed by hydrothermal reaction.

The type of the zeolite or zeotype material prepared according to the present method widely varies depending on the type of its precursor. The zeolite or zeotype material obtained is exemplified as follows:

(i) zeolites or zeotype materials having MFI framework (e.g., ZSM-5, silicalite-1, TS-1 and metallo-silicalite-1 with partially replaced transition metals);

(ii) zeolites or zeotype materials having MEL framework (e.g., ZSM-11, silicalite-2, TS-2 and metallo-silicalite-2 with partially replaced transition metals);

(iii) zeolites A, X, Y, L and beta, mordenite and ferrierite;

(iv) mesoporous silicas (MCM type, SBA type, MSU type and KIT type); and (v) other zeolites or zeotype molecules including mesoporous silica produced by the hydrothermal reaction.

The precursor of zeolite or zeotype material used in this invention includes, but not limited to, tetrapropylammonium hydroxide and tetraethyl orthosilicate for silicalite-1 crystal; tetrapropylammonium hydroxide, tetraethyl orthosilicate and sodium aluminate for ZSM-5 zeolite crystal; tetrapropylammonium hydroxide and titaniumtetraisopropoxide for TS-1 type molecular sieve crystal; tetrapropylammonium hydroxide, tetraethyl orthosilicate and metal salt for metallo-silicate-1 type molecular sieve crystal; tetrabutylammonium hydroxide and tetraethyl orthosilicate for zeolite or zeotype material crystal having MEL framework; tetraethylammonium hydroxide, tetraethyl orthosilicate and sodium aluminate for beta zeolite crystal; tetramethylammonium hydroxide, aluminium isopropoxide and silica sol for zeolite-A crystal; tetramethylammonium hydroxide, aluminium isopropoxide and tetraethyl orthosilicate for zeolite-Y crystal; and tetramethylammonium hydroxide, cetyltrimethylammonium bromide and tetraethyl orthosilicate for MCM-41 type mesoporous silica crystal.

The zeolite supercrystal prepared by the method described previously exhibits a uniformly oriented structure. Accordingly, in still another aspect of this invention, there is provided a zeolite supercrystal characterized in that the zeolite supercrystal is uniformly aligned and channels in the zeolite supercrystal are uniformly aligned.

The channels in zeolite or zeolite supercrystal consist of straight and sinusoidal channels. Accordingly, the expression, "the channels are uniformly aligned", means that each of the straight and sinusoidal channels has a uniform orientation. The orientations of straight and sinusoidal channels may be different or the same each other. Specifically, the orientation of supercrystals on substrate with the a- or c-axis perpendicular to the substrate means orientation of the straight channels parallel to the substrate plane and the sinusoidal channels perpendicular or parallel to the substrate plane. FIG. 10C represents the three-dimensional connections of micropores (the orientations of the straight and sinusoidal channels) in crystals of the present invention in a-axis orientation. As shown in FIG. 10C, the straight channels are aligned in the orientation parallel to the substrate plane and the sinusoidal channels are aligned in the orientation perpendicular to the substrate plane.

According to a preferred embodiment, the present zeolite supercrystal is aligned in a-, b- or c-axis orientation, more preferably, a- or c-axis, most preferably, a-axis orientation. The orientation indicated herein can be understood by referring to the axes depicted in FIG. 10C. The orientation of the present zeolite supercrystal could be controlled by varying the type of template (demonstrated in Example VI) and conditions for producing zeolite supercrystal. The present zeolite supercrystal can have a two- or three-dimensional structure.

The zeolite supercrystal of this invention is composed of uniformly oriented zeolite microparticles of which growth orientation is controlled, and shows a closely packed structure. In addition, the zeolite supercrystal embodies a nano-network system of zeolite pores.

The uniformly aligned zeolite supercrystal described above is firstly developed by the present inventors. While the conventional zeolites have a narrow range of application due to their random orientation and alignment, the zeolite supercrystal of this invention would be anticipated to maximize its applicability by means of overcoming the shortcomings of zeolites with random orientation.

The advantages and applications of this invention are summarized:

(a) Since the uniformly aligned polymer film prepared by the present method has a main chain uniformly oriented, its thickness and nature affect the type of light to be reflected. In addition, where crystals are grown in the uniformly aligned polymer film, its growth orientation can be controlled.

(b) The multi-crystal array of the uniformly oriented zeolite or zeotype material enables micropores of zeolites to be interconnected with uniform orientation, so that it maximizes the efficiency of the nanoreactor application.

(c) The orientation of zeolite or zeotype material crystals can be desirably controlled by chaining the type of template, making their economic value higher compared to randomly layered zeolite powders.

(d) The low cost of the template such as polyurethane makes it possible to produce the uniformly oriented zeolite supercrystals in cost-effective manner.

(e) Since a wide variety of polymer templates are available, the uniformly oriented zeolite supercrystals with a wider range of application can be obtained.

(f) Since the arrays of the uniformly oriented zeolite crystals can be prepared with no help of adhesive, the blockage and occlusion of zeolite pores could be prevented. In addition, micropores of zeolites in zeolite supercrystal are aligned and interconnected with uniform orientation, permitting the performance efficiency of zeolite or zeotype material to approach to 100%.

(g) The zeolite or zeotype material constituting the array of this invention exhibits micropores interconnected in uniform orientation and therefore molecules readily enter and rapidly pass through micropores. For that reason, the diffusion of molecules in micropores is no longer rate-limiting step and the usefulness of zeolite as nanoreactor is highlighted.

(h) Since the size and shape of micropores uniformly oriented readily vary by changing the type of zeolite or zeotype material and the decomposition rate of template, the crystals of zeolite or zeotype material with various application can be generated by immersing polyurethane or other polymeric template in various synthesis gel.

(i) The array of zeolite or zeotype material crystals having desired thickness can be obtained by readily adjusting the thickness of template, enabling the diffusion rate of molecules in micropores and physical strength to be controlled.

(j) The three-dimensional shape and size of zeolite or zeotype material supercrystal are easily adjusted by altering the shape of substrate. In addition, the substrate appropriate to a reactor configuration is readily charged into a reactor, which allows avoiding the inconvenience to charge substrate in a form of granule into and remove that from a reactor.

(k) The process for preparing zeolite or zeotype crystals is very simple and time-saving. It is noteworthy that zeolite or zeotype crystals finally obtained exhibits higher purity.

(l) The reproducibility of the process for preparing zeolite or zeotype crystals is excellent. The templates are purchasable in low-cost and massive manner.

(m) The zeolite or zeotype crystal of this invention can be adopt to all applications of conventional zeolites such as catalyst, carrier for catalyst, adsorbent, ion exchanger and water-absorbing agent. In addition to this, with the help of the uniform arrangement of its micropores, the zeolite or zeotype crystal could induce the arrangement of various molecules, a quantum beam or point of semiconductor, a molecular circuit, a photosensitive device, a luminant, a nonlinear optical material or a laser luminant. Such ability enables unique characteristics of nanoparticles to be exhibited and selective separation of laser light to unlimited wavelength.

The following specific examples are intended to be illustrative of the invention and should not be construed as limiting the scope of the invention as defined by appended claims.

EXAMPLE I

Synthesis of Polymer Film Uniformly Aligned

A substrate (e.g., silicone wafer, 10×10 mm; glass plate, 18×18 mm) was placed in the vacuum-tight stainless steel reaction chamber depicted in FIG. 1 and monomers for polymer were charged into two glass flasks, respectively. Prior to the reaction, the chamber and glass flasks were kept under vacuum ($10^{-2}$ torr), and each solenoid valve was closed, followed by elevating the temperature of an oven in which the chamber was placed. At this time, the suitable temperature of the oven varies depending on the type of monomers of polymer and in general, was maintained at a temperature higher 30° C. than a vaporizing temperature of monomers. For example, the left glass flask (numbered 1) was charged with 1,4-phenylene diisocyanate (b.p. 260° C. at 760 torr), the right glass flask (numbered 3) was charged with 2-butyne-1,4-diol (b.p. 238° C. at 760 torr) and two flasks were vacuumed ($10^{-2}$ torr), followed by elevating the oven temperature up to 120° C.

When the temperature was in equilibrium and then 30 min was lapsed, the reaction was initiated. Firstly, a solenoid valve (numbered 1) of the left flask was opened to spray 1,4-phenylene diisocyanate (PDI, Aldrich) for 1 sec and all the valves were closed for 30 sec to allow urethane reaction (—NH—CO—O—) between the introduced vapor and the hydroxyl groups on the substrate. Then, the non-reacted, excess 1,4-phenylene diisocyanate was removed from the chamber by opening the vacuum valve (numbered 2) for 45 sec and a solenoid valve (numbered 3) of the right flask was opened to spray 2-butyne-1,4-diol (BDO, Aldrich) for 10 sec. After the spraying, all the valves were closed for 30 sec to allow urethane reaction (—NH—CO—O—) between the introduced vapor and the isocyanate groups (—N=C=O) of PDI linked onto the substrate and the non-reacted, excess BDO was removed from the chamber by opening the valve of No. 2 for 45 sec.

The serial procedure was defined as one layer. With operating all the three valves by the automatic controller, the 100-, 500- and 1000-layered polyurethane films uniformly aligned were prepared.

Through the serial procedure using various monomers and substrates, a wide variety of polymer films were prepared on the substrate.

As shown in FIG. 2, the 100- (A), 500- (B) and 1000- (C) layered polyurethane films were measured to have the thickness of 95 nm, 360 nm and 610 nm, respectively.

Figure 3A:
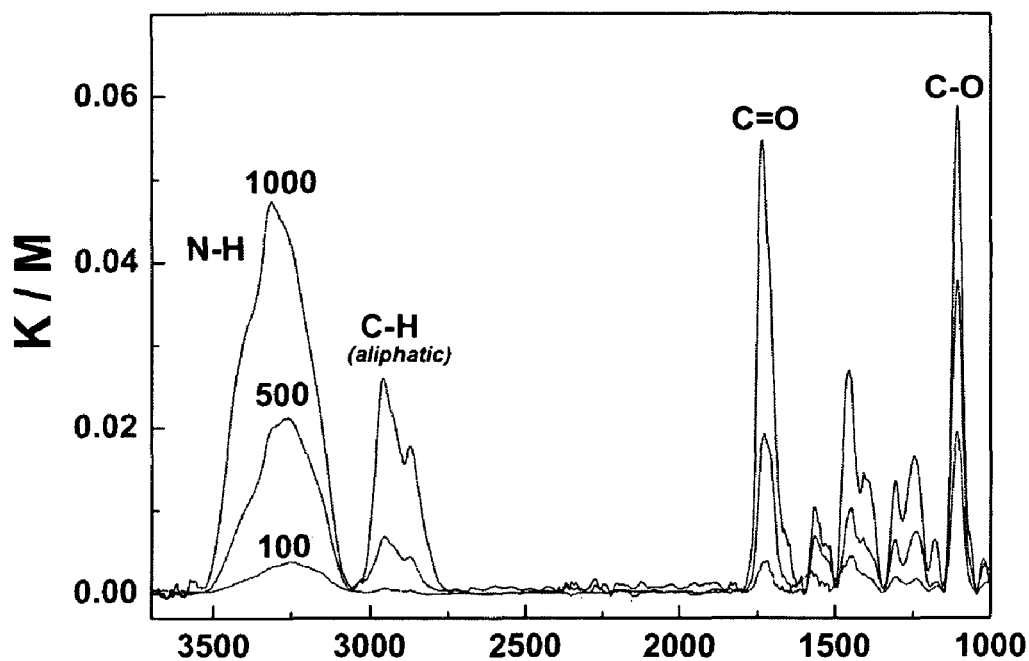
FIGS. 3A-3C represent the diffuse reflectance Fourier-Transform infrared (FT-IR) spectra of uniformly aligned polyurethane films prepared in Example I, indicating that the intensities of the characteristic bands (22) of polyurethane increase with increasing the layer of the polymer (FIGS. 3A-3B), and the plane-polarized grazing angle FT-IR spectra of the polymer (FIG. 3C).
Figure 3B:
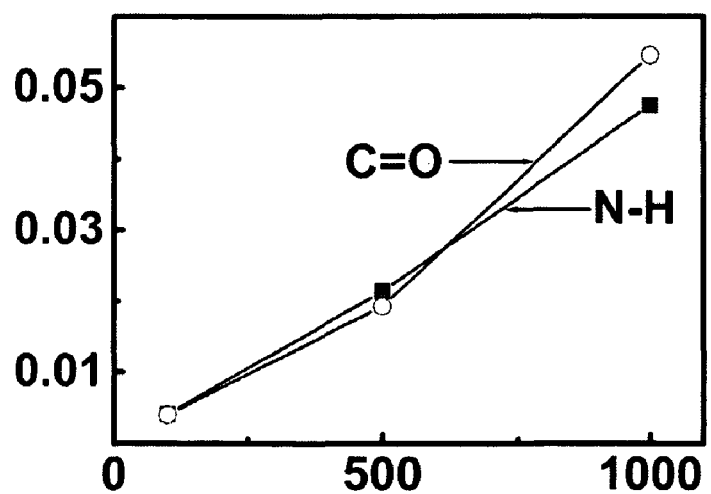

In addition, as represented in FIG. 3A, the diffuse reflectance Fourier-Transform infrared (FT-IR) spectra of the polyurethane films showed characteristic N—H, C—H (aliphatic), C=O and C—O stretching bands of polyurethane at 3318, 2959, 1735 and 1107 cm$^{-1}$. The intensities of the stretching bands for N—H and C=O linearly increased with increasing the layer of the polymer as shown in FIG. 3B, indicating that the thickness of the polymer increases with increasing the number of the reaction cycle.

Figure 3C:
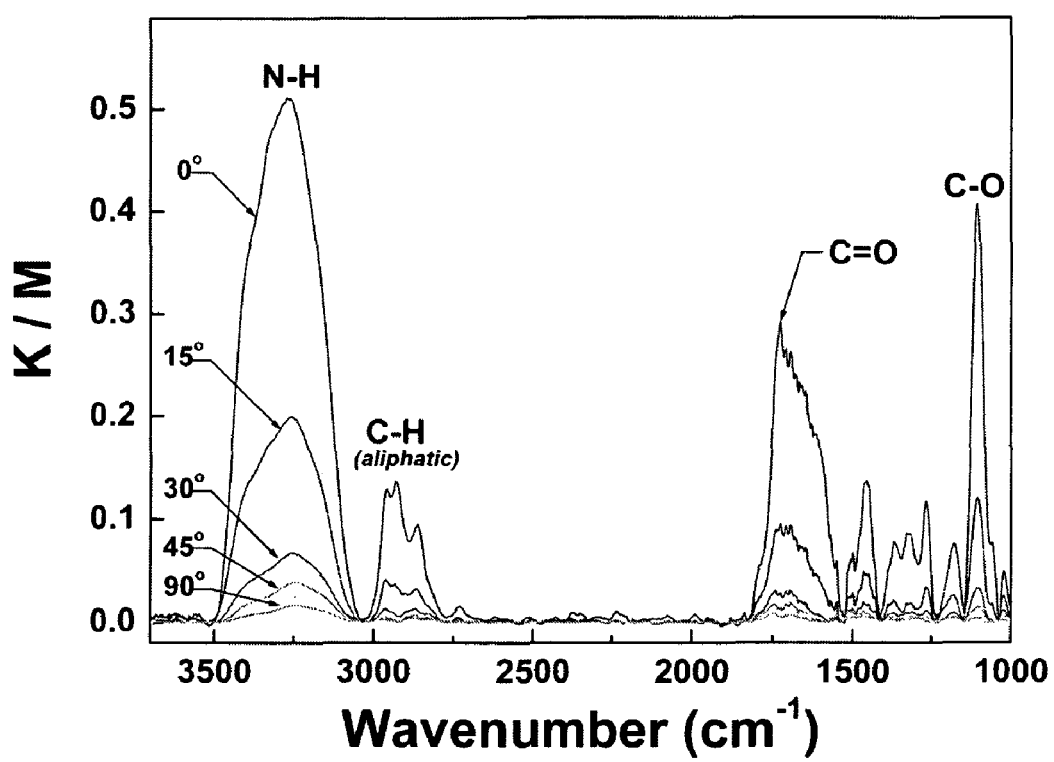

The plane-polarized grazing angle FT-IR spectra further revealed that the intensities of N—H, C—H (aliphatic), C=O and C—O stretching bands decrease as the dihedral angle between the plane of polarization and the substrate increases from 0 (p-polarization) to 90° (s-polarization) (FIG. 3C), indicating that N—H, C—H (aliphatic), C=O and C—O bonds are oriented parallel to the substrate plate.

FT-IR spectra were measured on a Jasco FT-IR 620 spectrometer (Japan). The polarized grazing angle FT-IR spectra were obtained from the above spectrometer using a Spectra-Tech grazing angle accessory (model 0014-051) equipped with a plane polarizer.

Figure 5A:
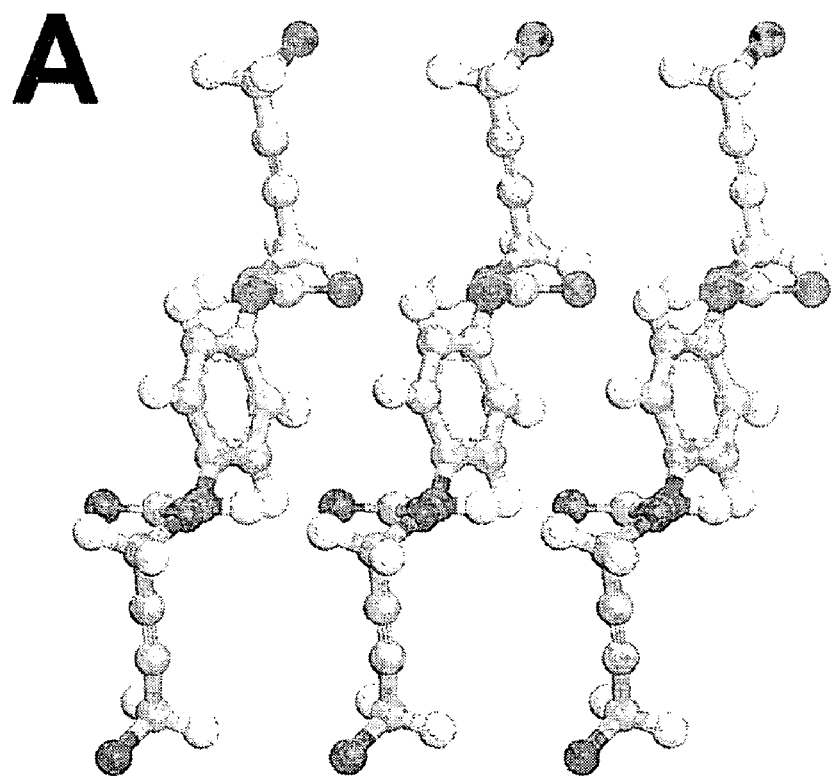
FIGS. 5A-5B represent the proposed structure and interchain interaction of uniformly aligned polyurethane films prepared in Example I, which are created based on the FT-IR spectra data of FIG. 3.
Figure 5B:
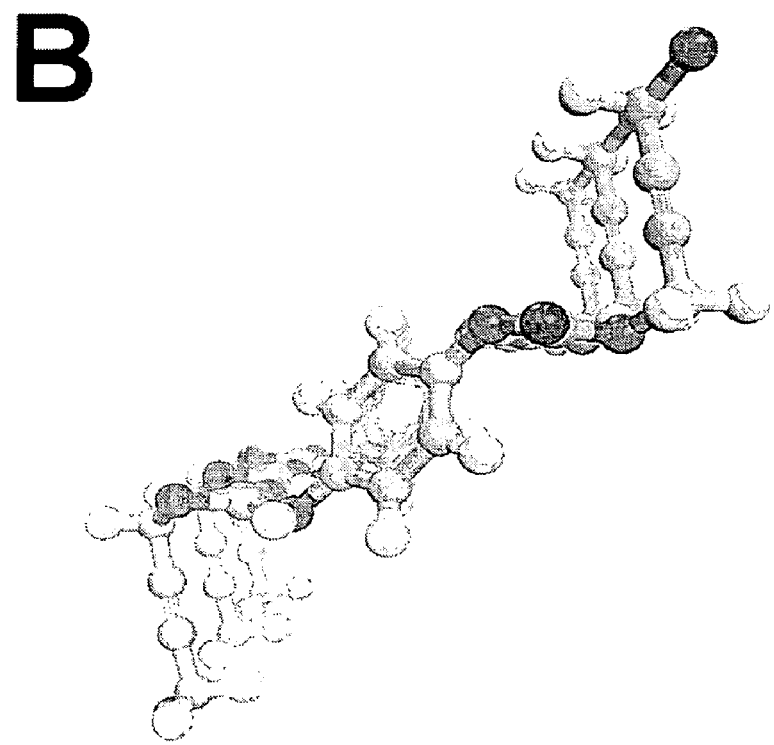
Figure 6:
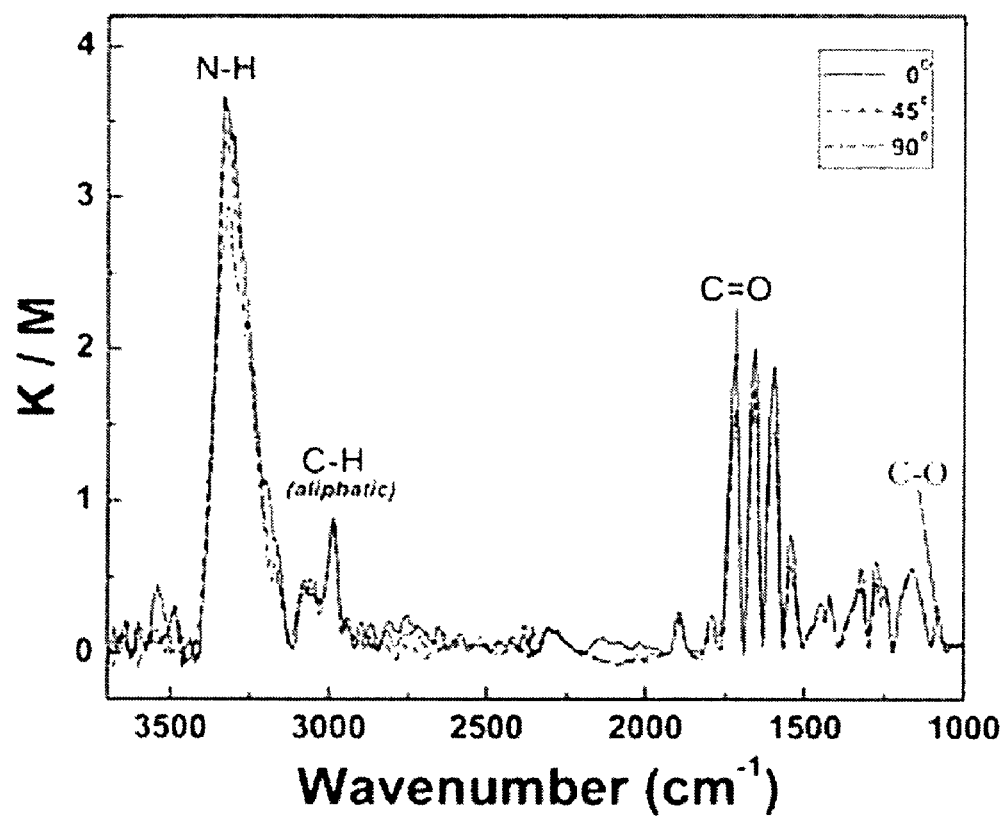
FIG. 6 shows the plane-polarized grazing angle FT-IR spectra of randomly oriented polyurethane films supported on a silicon wafer, which was prepared by spin-coating (22). These spectra demonstrate that the polyurethane films prepared by spin-coating are randomly oriented.

FIG. 5 represents that the proposed structure and interchain interaction of the polyurethane film prepared in this Example, based on the IR data of FIG. 3. FIG. 5A depicts the hydrogen bonding between the H atom and N and the O atom in C=O unit, and FIG. 5B shows the horizontal orientation of N—H, C—H, C=O and C—O bonds.

As a comparative example, the present inventors also prepared silicon wafer coated with randomly oriented polyurethane film by spin-coating the wafers with the slurry of poly-(PDI-BDO) fibers in ethyl acetate. In contrast to the uniformly aligned polyurethane film, the FT-IR intensities of the randomly oriented polyurethane film remained nearly invariant regardless of the dihedral angle, demonstrating that the polyurethane film by spin-coating is randomly oriented.

EXAMPLE II

Synthesis of Polymer Mass Uniformly Aligned

The uniformly aligned polymer films prepared in Example 1 were immersed in diluted HF solution to melt down the glass substrate. The remained polymer mass was washed several times with distilled water and slowly dried at room temperature.

EXAMPLE III

Synthesis of Crystals of Organic or Organometallic Compound

The excessive amount of organic or organometallic compound (e.g., ureas such as 1,3-diphenylurea, phenylphenylcarbamate, 2-(benzooxy)ethyl phenylcarbamate; urethane; and monomer containing ester) was dissolved in toluene with heating to 110° C. and then boiled for 3 hr. Following the reaction, the resultant was slowly cooled at room temperature to obtain crystals. The crystals were isolated, washed several times with toluene and then washed with distilled water, followed by slowly cooling at room temperature.

Figure 7A:
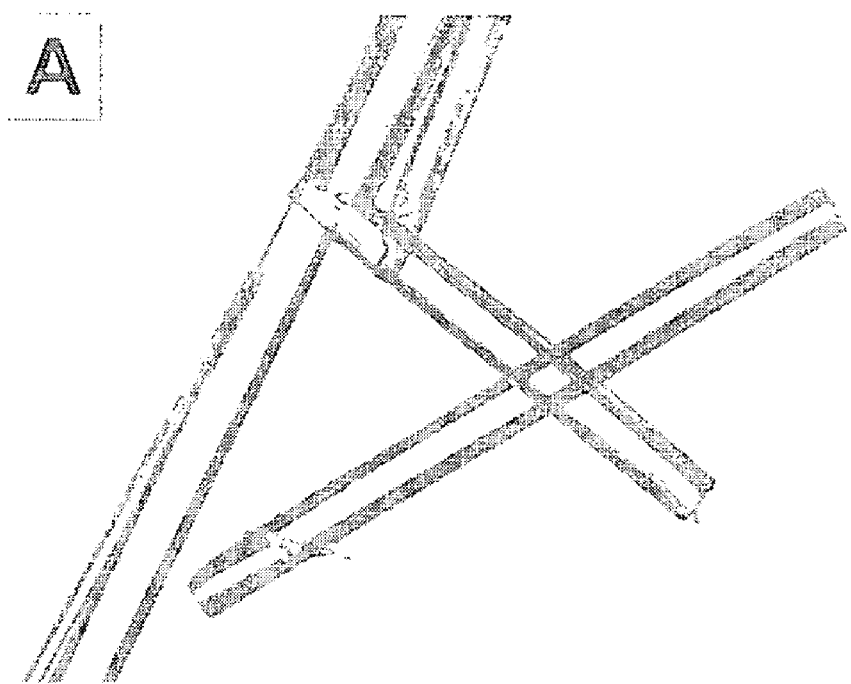
FIGS. 7A-7B represent the optical microscope images of the crystals of organic or organometallic compound prepared in Example III.
Figure 7B:
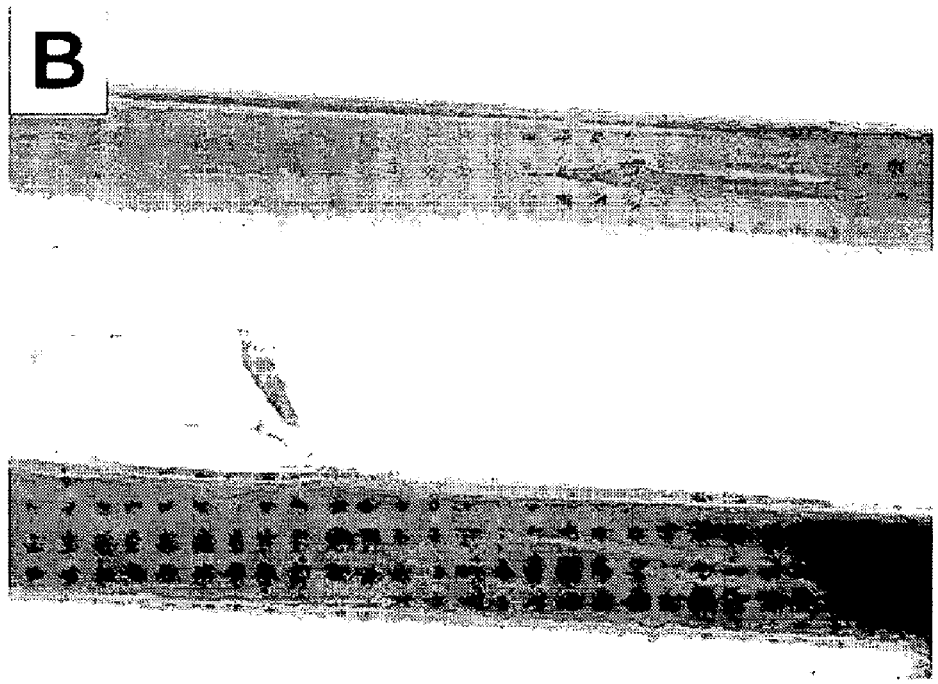

As shown in FIG. 7, the crystals of organic or organometallic compound prepared showed pellucidity and gloss as generally found in single crystal and revealed to have a uniform surface under magnifying observation.

EXAMPLE IV

Synthesis of Silicalite-1 Supercrystals Uniformly Grown in Uniformly Aligned Polymer Template or Crystals of Organic or Organometallic Compound Ten g of 1M solution of tetrapropylammoniumhydroxide (TPAOH, ACROS), which is used as a template for the preparation of zeolite or zeotype material having a structure of MFI configuration were added to 30 g of distilled water, to which 9.78 g of tetraethyl orthosilicate (TEOS, Aldrich) were added as silicone source and completely hydrolyzed under stirring. 40 ml of the resulted colorless and transparent gel for the preparation of silicalite-1, and the polymer film, polymer mass or crystal of organic or organometallic compound prepared previously were charged to an autoclave and undergone the hydrothermal reaction for 2 hr at 180° C., thereby yielding silicalite-1.

After the completion of the reaction, the silicalite-1 supercrystal showing a uniform growth pattern was washed several times with distilled water and dried in oven for 10 min at 120° C. The silicalites physically adsorbed were purged for 5 sec using 100 kPa nitrogen gas.

Although crystals are strongly inclined to grow with b-axis on a substrate activated with hydroxyl groups, the present invention could to provide silicalite-1 supercrystals with a compact form aligned with the c-axis perpendicular to the substrate.

Figure 8A:
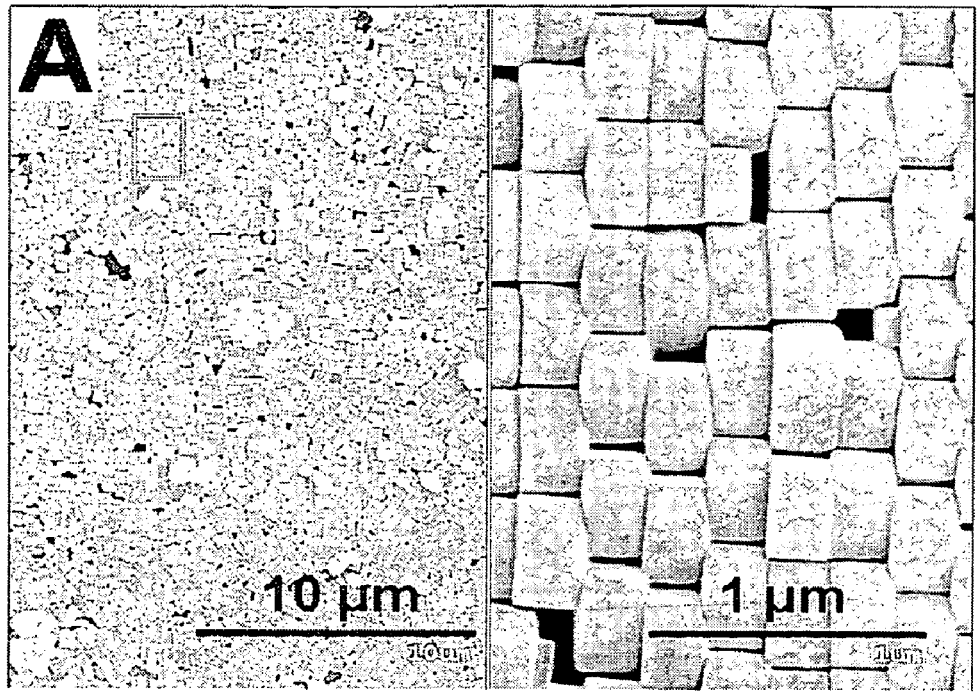
FIGS. 8A-8F represent the analysis results of silicalite-1 supercrystal grown in the orientation of c-axis by use of the uniformly oriented polyurethane template (500 layers) prepared in Example I.
Figure 8B:
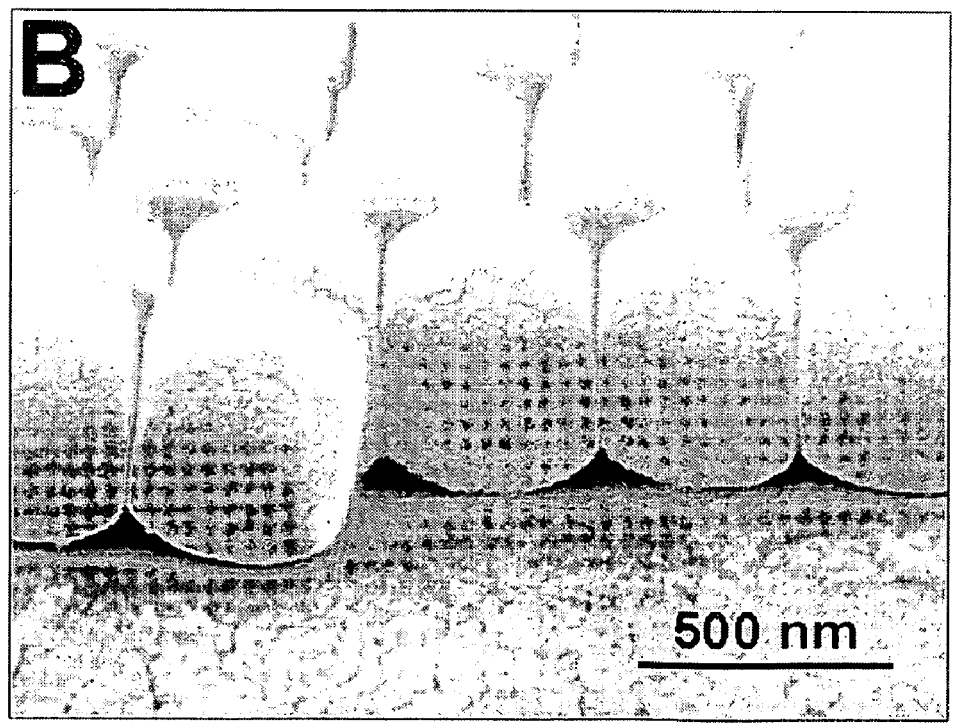
Figure 8C:
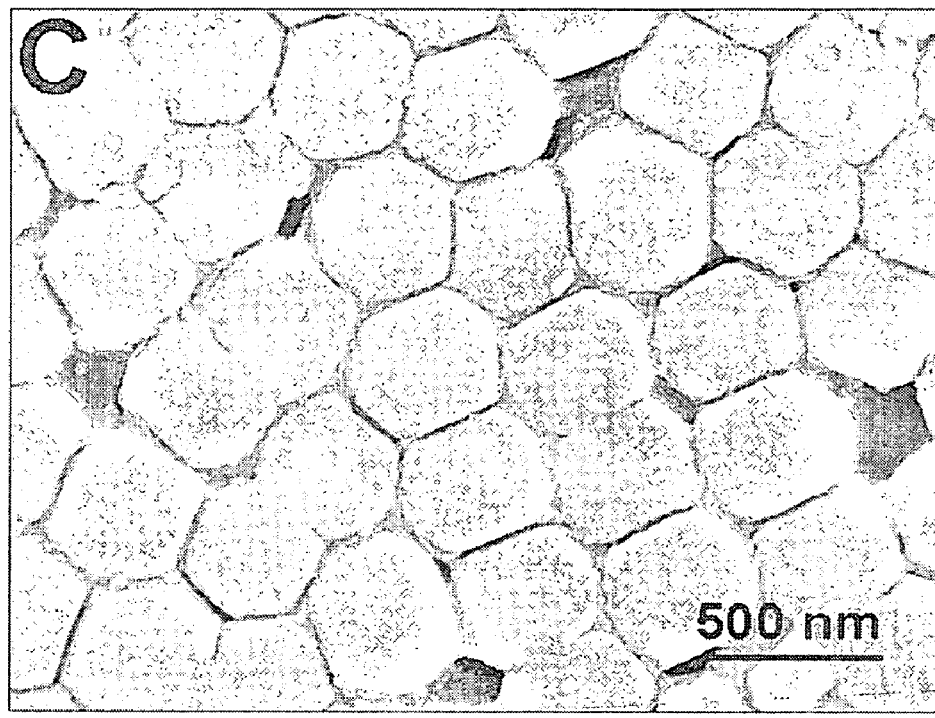

The SEM images of FIG. 8A revealed that the glass plates are indeed covered with closely packed 2D arrays of silicalite-crystals with the average size of 370×200×500 nm. Interestingly, the SEM images of the cross sections (FIG. 8B) revealed that a great majority of the silicalite-1 crystals are aligned with the c-axis perpendicular to the substrate plane despite of the fact that the crystals are narrow and round along the c-axis. Accordingly, they are closely packed with the flat (100) and (010) faces contacting each other. In strong contrast, all the silicalite-1 crystals grown on the bare glass plates were oriented with the b-axis perpendicular to the substrate (FIG. 8C).

Figure 8D:
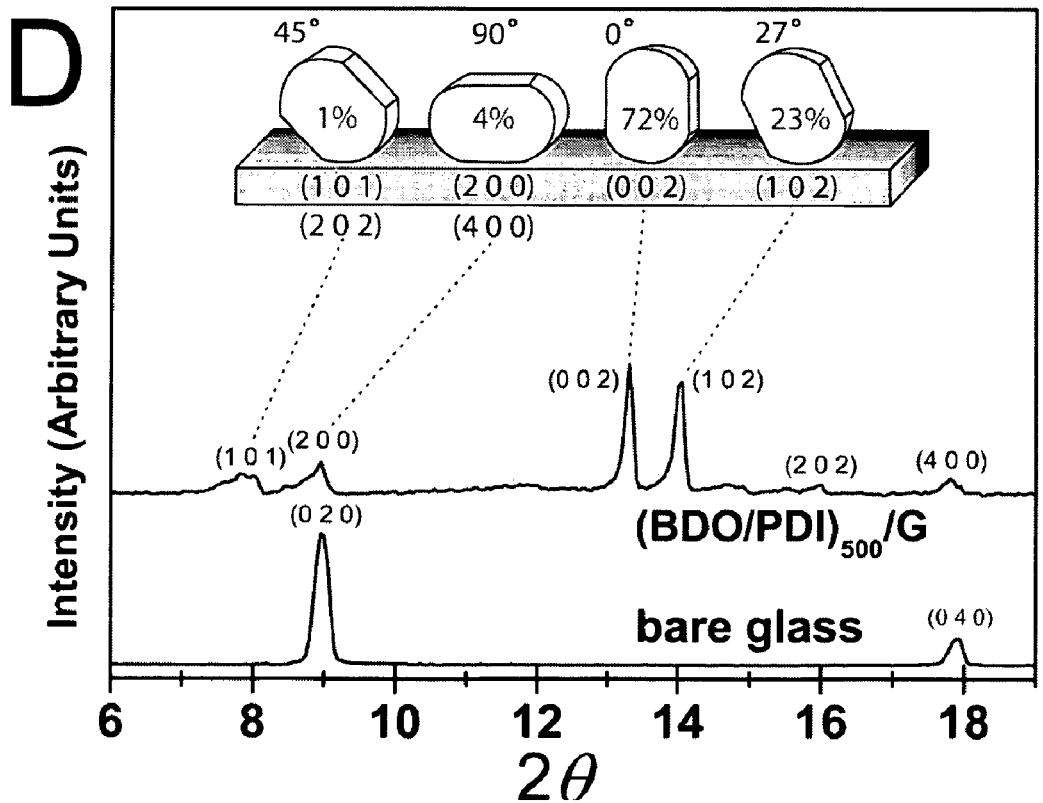

The multi-crystal arrays gave the x-ray diffraction peaks at 8.00°, 8.90°, 13.30°, 14.00°, 16.00° and 17.75° in the 2θ region between 6° and 19°, with the relative intensities of 14, 25, 100, 83, 8 and 12, respectively (FIG. 8D). The above diffraction peaks are assigned to the reflections arising from (101), (200), (002), (102), (202) and (400) planes, respectively. The corresponding crystal orientations are illustrated in FIG. 8D. By taking the simulated relative reflection intensities of the randomly oriented powders into account (13), the calculated contribution of each orientation was 1, 4, 72 and 23%, respectively. Thus, 72% of the crystals were oriented with the c-axis perpendicular to the plane, and the remaining 28% were tilted by 27° (23%), 45° (1%) and 90° (4%) from the upright orientation. The present inventors found that the tilting of the crystals occurs during the removal of the sedimented, randomly aggregated crystals from the underlying supercrystals. It is noteworthy that the corresponding x-ray diffraction peaks recorded from the silicalite-1 crystals grown on bare glass plates were 9.00° and 17.95° within the same region, consistent with their b-axis being oriented perpendicular to the substrate planes.

Figure 8E:
Figure 8F:
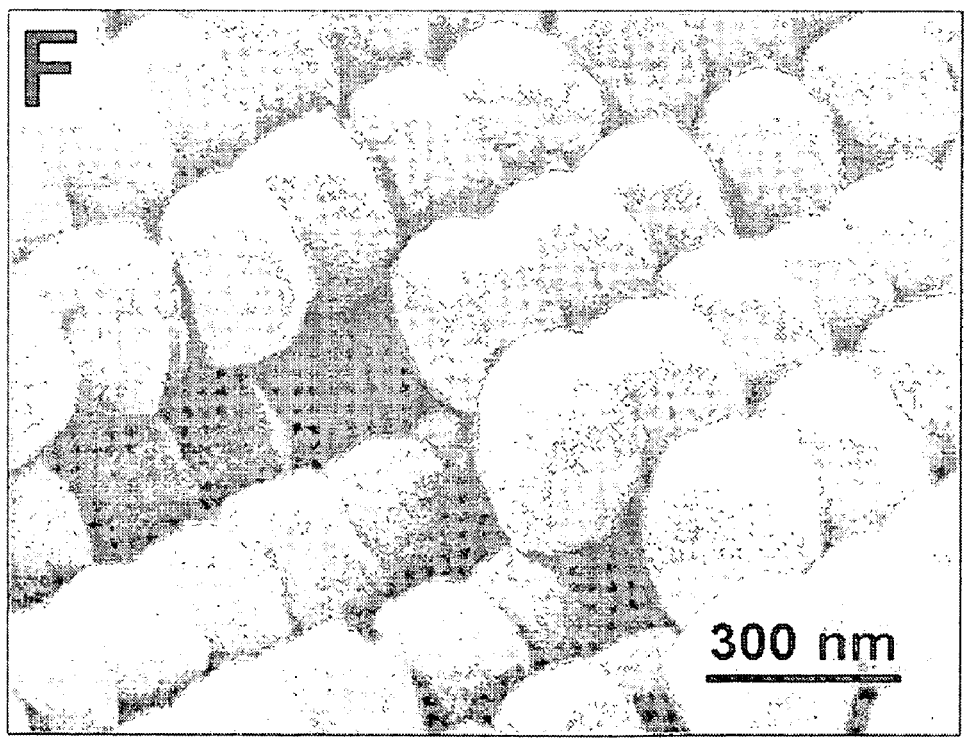

The crystal shapes and sizes readily varied by slightly changing the relative amount of TPAOH in the gel. For instance, larger (550×200×900 nm) crystals with sharp edges appeared upon slightly decreasing the basicity of the gel (FIG. 8E). On the other hand, the crystals became smaller and round (250×170×300 nm) (FIG. 8F), upon slightly increasing the basicity of the gel. In particular, the results represented in FIG. 8F indicate that even 3D arrays of uniformly aligned silicalite-1 crystals can be produced according to the present invention.

Figure 9:
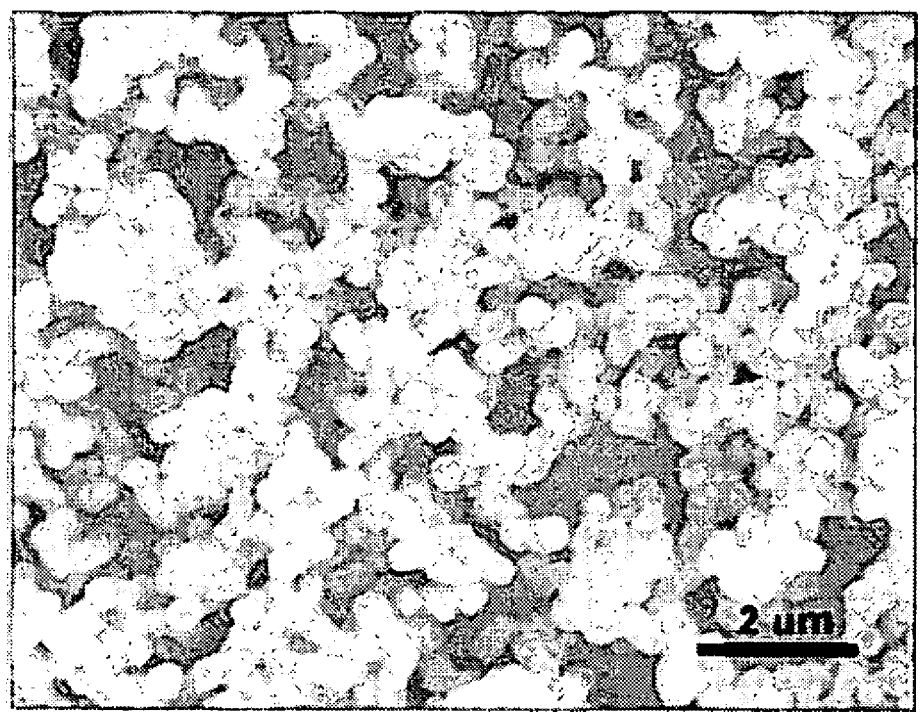
FIG. 9 is SEM image of randomly aggregated silicalite-1 crystals grown from the randomly oriented polyurethane film prepared in FIG. 6.

It should also be noted that the glass plates coated with randomly oriented polyurethane fibers gave only randomly aggregated crystals (FIG. 9).

Based on the experimental results described above, the present inventors propose that the following series of events occur sequentially: The uniformly aligned polyurethane chains are first hydrolyzed by TPAOH at the reaction temperature. The hydrolyzed products (such as phenylenediamine and BDO or phenylenediamine, terephthalic acid and ethylene glycol) retain uniform alignment under the dense and viscous synthesis gel. The TPA$^+$-incorporating nanoslabs with a size of 1-2 nm in the synthesis gel penetrate into the uniformly aligned organic layer with either the a- or c-axes pointing perpendicular to the substrate depending on the nature of hydrolyzed products. The nanoslabs and the surrounding aligned organic products from an ordered supramolecularly organized organic-inorganic composite. The incarcerated nanoslabs undergo cross linking between them, accompanied with the slow release of the hydrolyzed organic fragments into the mother liquor leading to the growth of ordered silicalite-1 multi-crystal arrays with specific orientations.

In support of the above formulation, the present inventors observed that the polymer layers transformed into much thicker films (by about 10 times) consisting of carbon, oxygen, and silicon in the average atomic ratio of 42:38:20 after reaction for 80 min, indicating that the layers are indeed composed of hydrolyzed polyurethane fragments and silicon species (nanoslabs) (FIGS. 11 and 12).

EXAMPLE V

Synthesis of Silicalite-1 Supercrystal Uniformly Grown in Uniformly Aligned Nylon, Polyimide, Polyamideimide or Urea Films The procedures in this Example are the similar to those in Example IX, except that nylon, aromatic or aliphatic polyimide, polyamideimide or urea uniformly aligned on the substrate were used as a template.

Since the uniformly aligned polymer template in which zeolite or zeotype molecular sieve crystal is grown serves as a template, the growth pattern of the crystal is governed by the molecular structure and change of linkages as well as uniformly aligned structure of the polymer. When the crystal is grown, the polymer film should be hydrolyzed in the similar rate to the growth rate of the crystal, to generate organic amines or ammonium salts.

The uniformly aligned nylon, aromatic or aliphatic polyimide, polyamideimide or urea films were prepared according to the procedures in Example I.

Using the apparatus described in Example 1, 1,4-phenylene diamine (PDA, Aldrich) instead of 2-butyne-1,4-diol (diol without ester group) was charged to the right glass flask (numbered 3) and the two glass flasks and the reaction chamber containing substrate were kept under vacuum ($10^{-2}$ torr) prior to the reaction. Each solenoid valve was closed and the temperature of an oven in which the chamber was placed was elevated to 120° C. The subsequent procedures were carried out as described in Example I, to prepare a uniformly aligned poly urea template.

The film obtained and the gel for the preparation of silicalite-1 were undergone the hydrothermal reaction to yield silicalite-1, as described in Example IX. As a result, the silicalite-1 of which growth pattern was uniformly controlled, was produced.

Although crystals are strongly inclined to grow with b-axis on a substrate activated with hydroxyl groups, the present invention could to provide silicalite-1 supercrystals with a compact form aligned with the c-axis perpendicular to the substrate. Since the uniformly aligned nylon, aromatic or aliphatic polyimide, polyamideimide or urea films exhibit lower hydrolysis rate than polyurethane, the crystal growth was performed at a relatively low temperature (50-160° C.) for a longer period of time (3-5 hr).

EXAMPLE VI

Synthesis of Silicalite-1 Supercrystal Uniformly Grown in Uniformly Aligned Polymer Template or Crystals of Organic or Organometallic Compound Bearing Ester Group The procedures in this Example are the similar to those in Example IX, except that the ester-containing polyurethane uniformly aligned on the substrate was used as a template.

Using the apparatus described in Example I, terephthalic acid bis-(2-hydroxy ethyl)ester (TBE) containing ester groups instead of 2-butyne-1,4-diol (diol without ester group) was charged to the right glass flask (numbered 3) and the two glass flasks and the reaction chamber containing the substrate were kept under vacuum ($10^{-2}$ torr) prior to the reaction. Each solenoid valve was closed and the temperature of an oven in which the chamber was placed was elevated to 180° C. The subsequent procedures were carried out as described in Example I, to prepare a uniformly aligned polyurethane template containing ester groups.

The film obtained thus was undergone the hydrothermal reaction to yield silicalite-1 supercrystals aligned with the a-axis perpendicular to the substrate, as described in Example IX.

The orientation of the silicalite-1 supercrystals was verified by x-ray diffraction analysis. Using diverse substrates, the uniformly aligned silicalite-1 supercrystals grown with a-axis were formed on a variety of substrates.

Figure 4A:
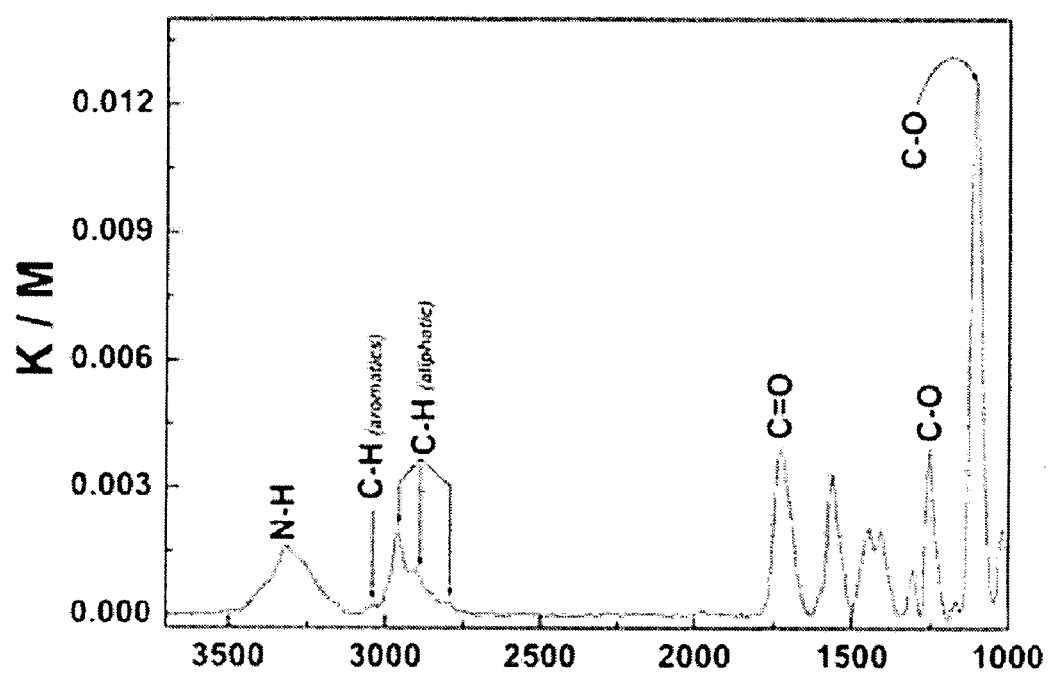
FIGS. 4A-4B show the diffuse reflectance FT-IR spectra of uniformly aligned polyurethane films containing ester groups prepared in Example VI (FIG. 4A) and the plane-polarized grazing angle FT-IR spectra of the polymer (FIG. 4B).
Figure 4B:
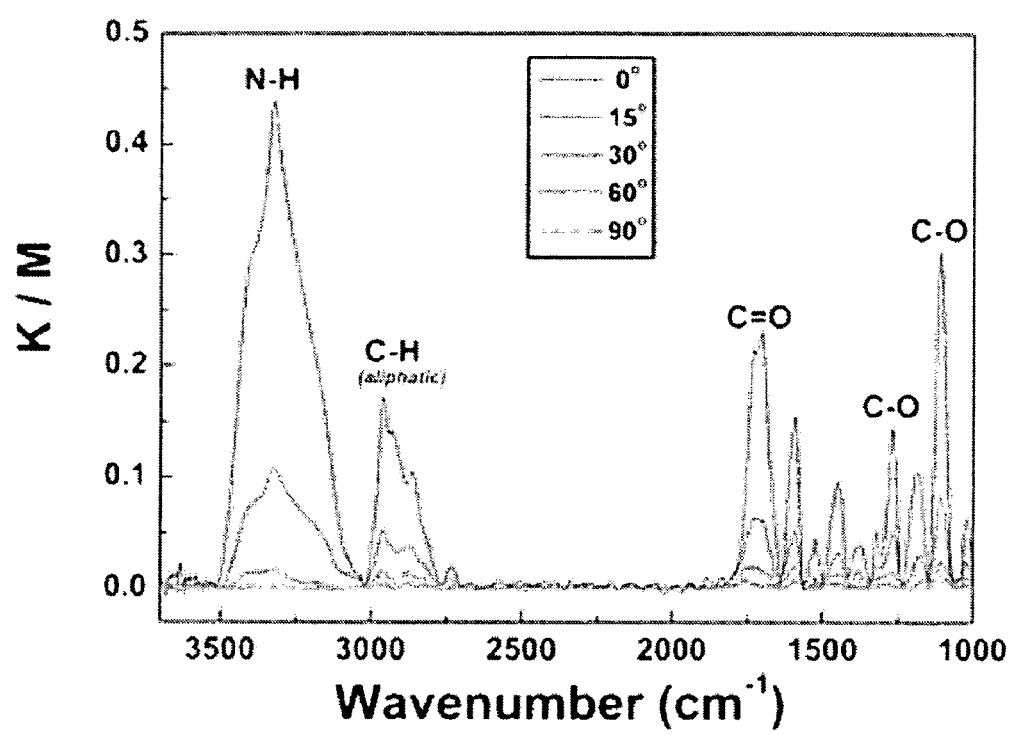

As shown in FIG. 4A, the diffuse reflectance Fourier-Transform infrared (FT-IR) spectra of the polyurethane film containing ester groups showed characteristic N—H, C—H (aliphatic), C=O and C—O stretching bands of polyurethane at 3320, 2962, 1728 and 1108 $cm^{-1}$. The plane-polarized grazing angle FT-IR spectra further revealed that the intensities of N—H, C—H (aliphatic), C=O and C—O stretching bands decrease as the dihedral angle between the plane of polarization and the substrate increases from 0 (p-polarization) to 90° (s-polarization) (FIG. 4B), indicating that N—H, C—H (aliphatic), C=O and C—O bonds are oriented parallel to the substrate plate.

Figure 10A:
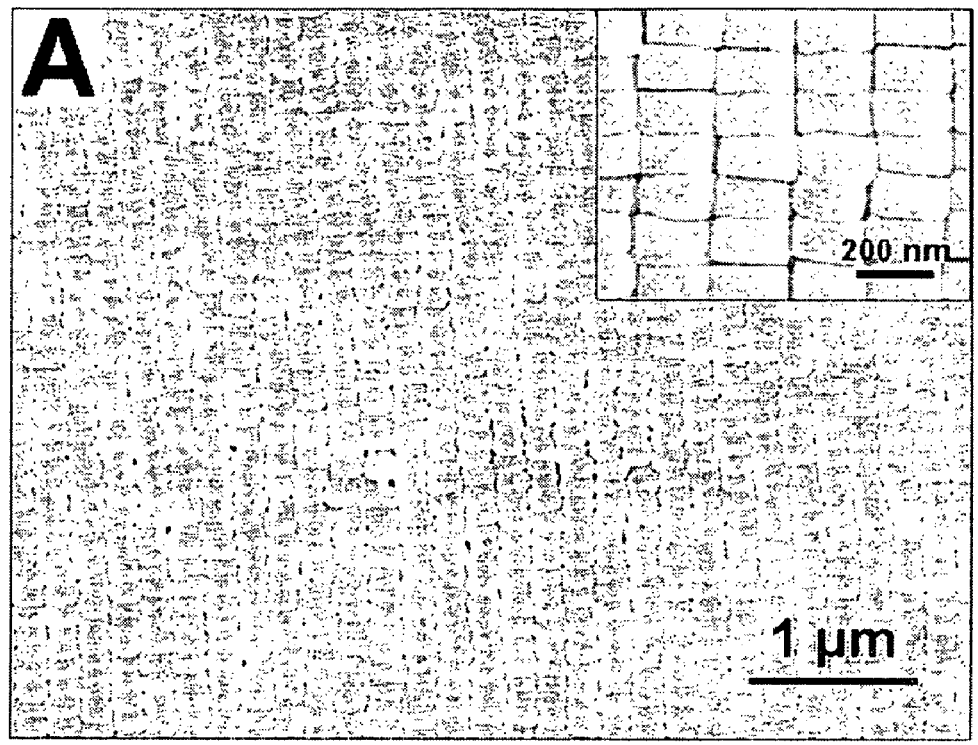
FIGS. 10A-10C represent the results of silicalite-1 supercrystal in a-axis orientation grown from uniformly oriented polyurethane films (500 layers) containing ester groups prepared in Example 6.
Figure 10B:
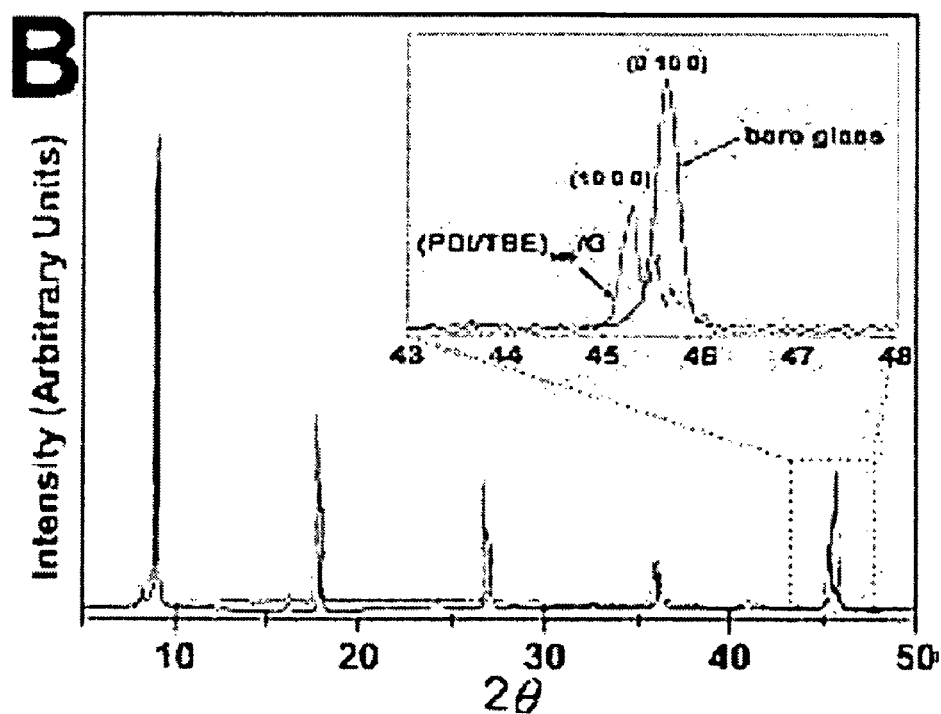
Figure 10C:
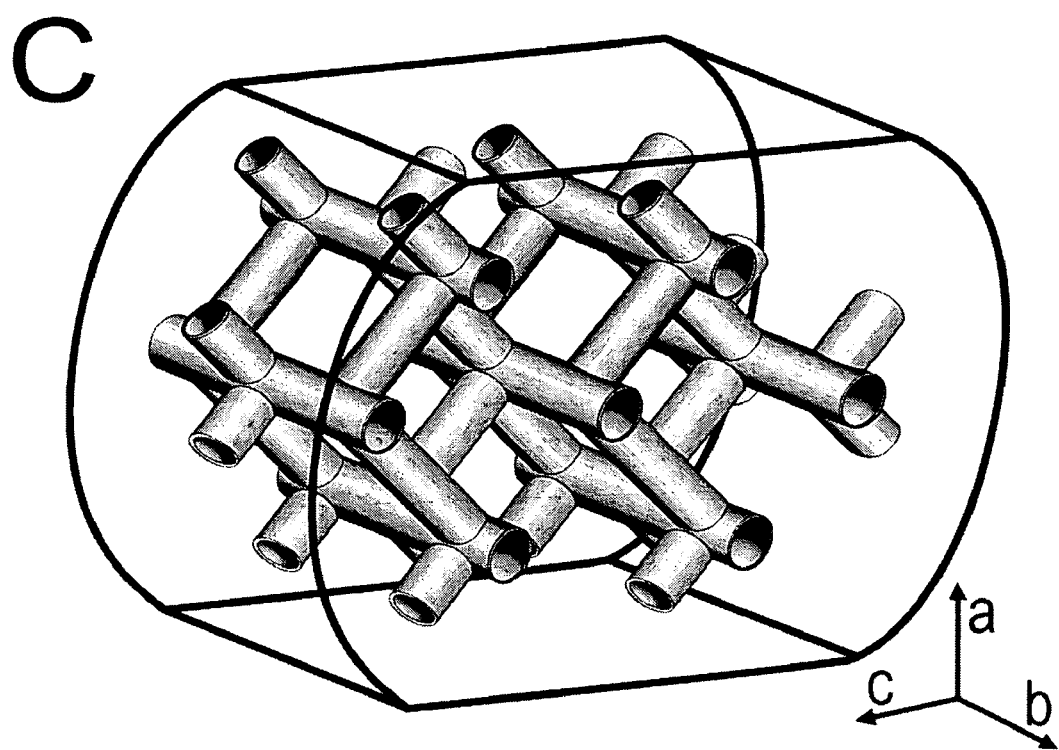
Figure 11A:
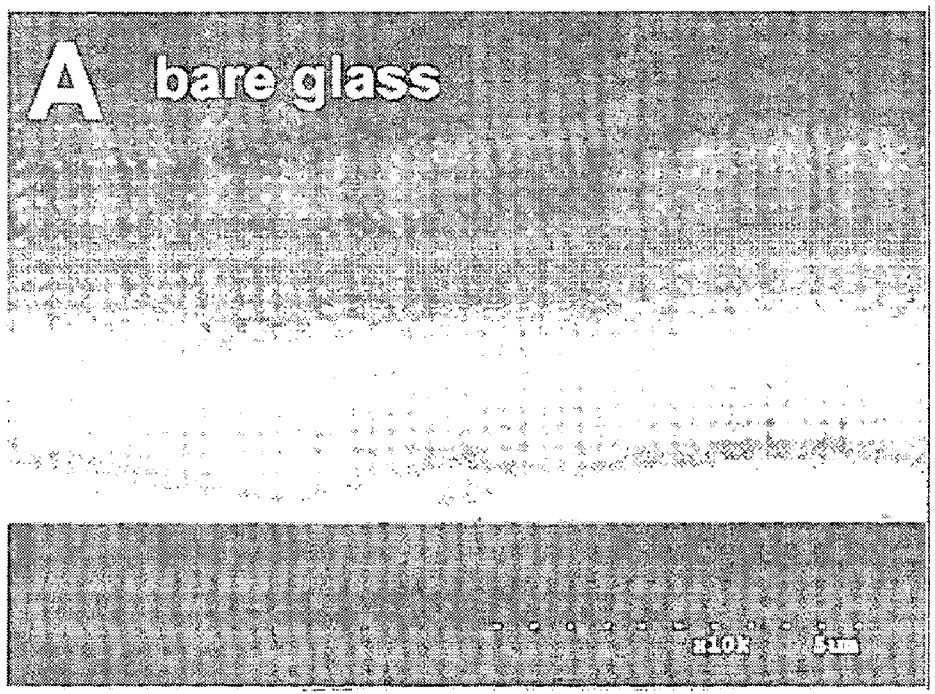
FIGS. 11A-11D represent the intermediate results of silicalite-1 grown with c-axis orientation and from uniformly oriented polyurethane film prepared in Example I. The reaction was performed for 1 hr 20 min at 180° C. SEM image was not observed on a bare glass (FIG. 11A). For 50-layered (FIG. 11B), 100-layered (FIG. 11C) and 500-layered (FIG. 11D) polyurethane templates, the thicknesses of the results were measured to be 220 nm, 880 nm and 3530 nm, respectively.
Figure 11B:
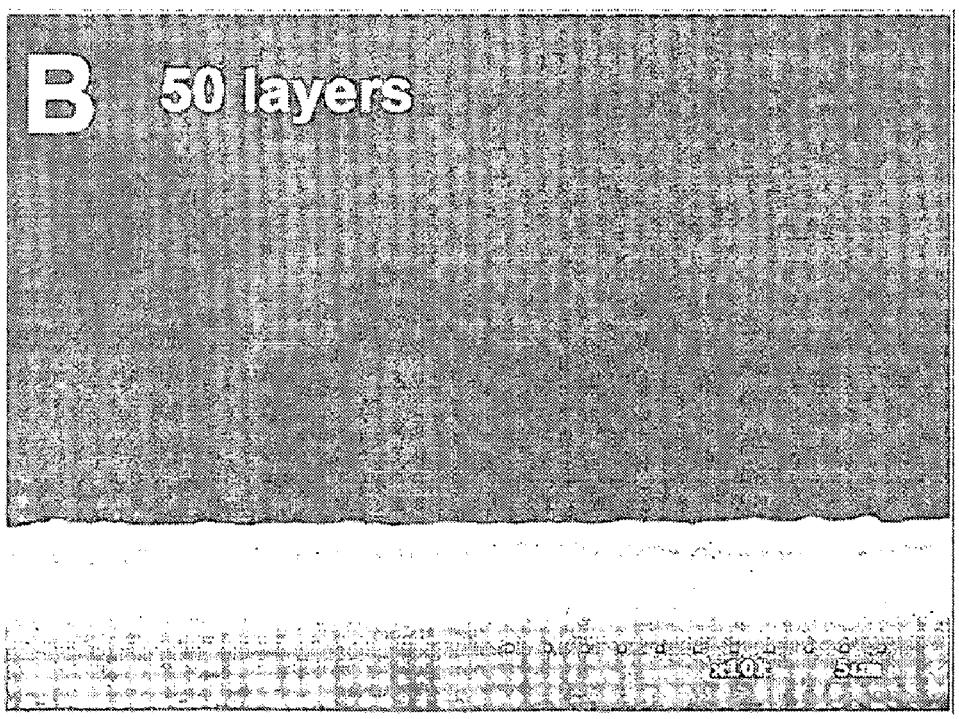
Figure 11C:
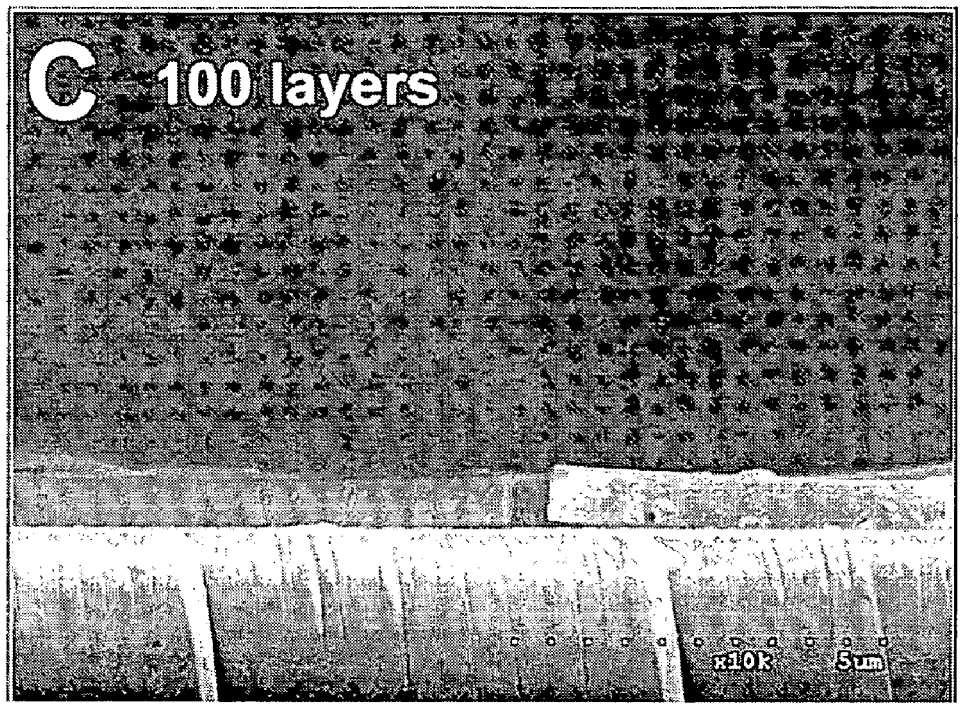
Figure 11D:
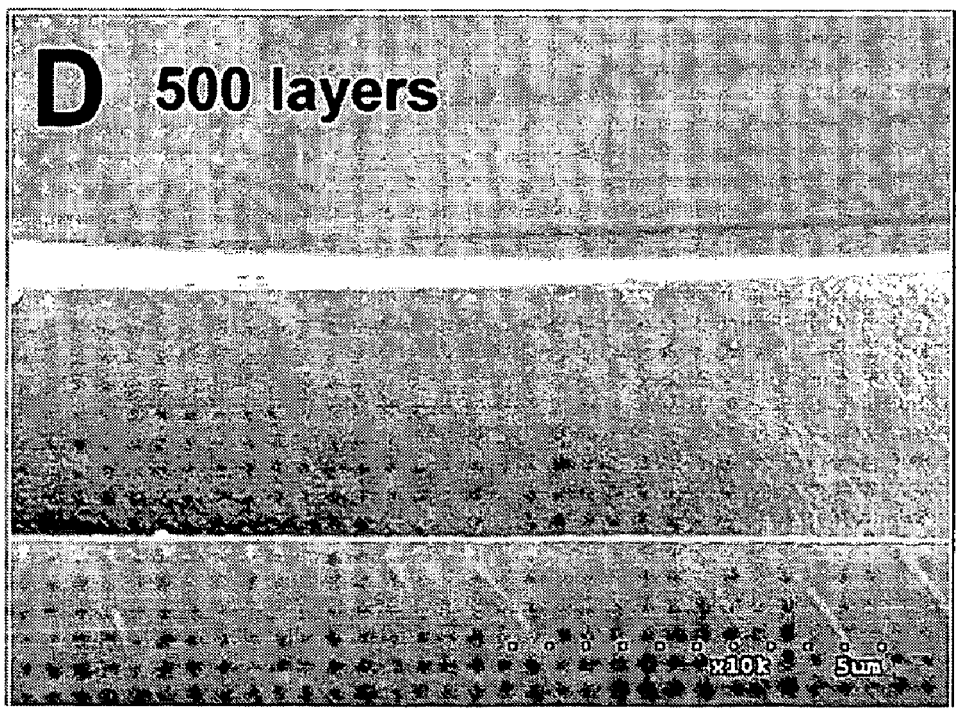
Figure 12A:
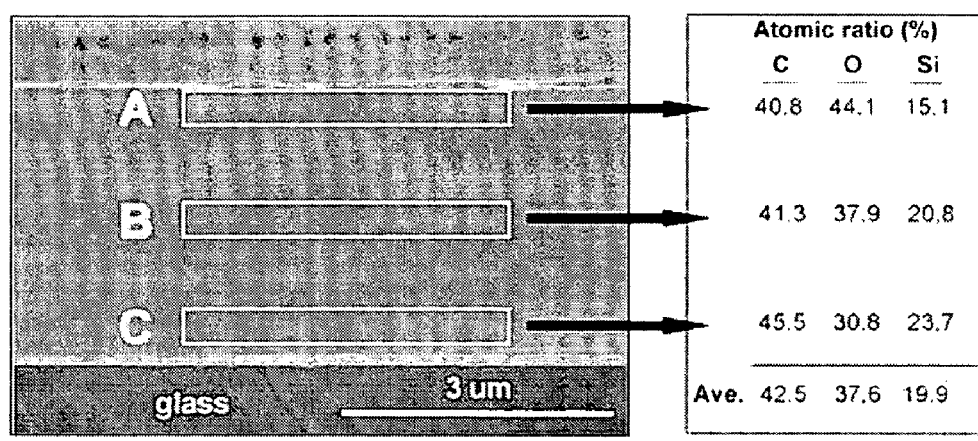
FIGS. 12A-12D show the elemental analysis (EDX) of the intermediate polymer of FIG. 11D. It is appreciated that silicon atoms of the synthesis gel and decomposed products of the polymer template are homogeneously presented over the entire film in significant amounts.
Figure 12B:
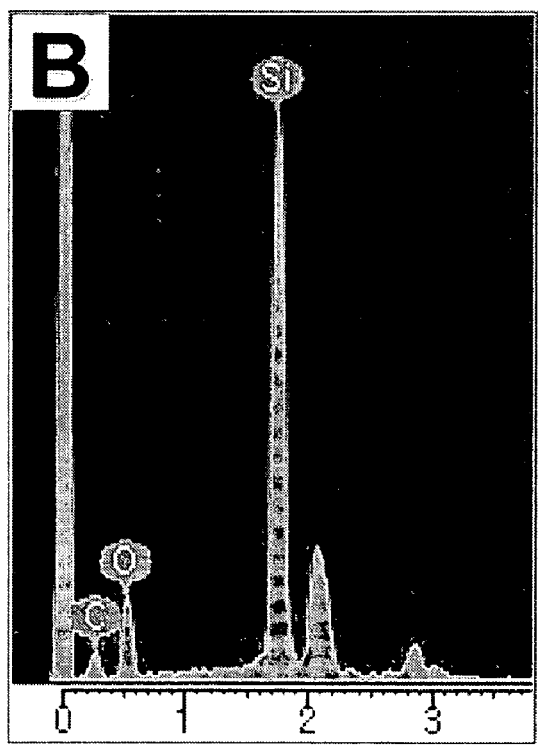
Figure 12C:
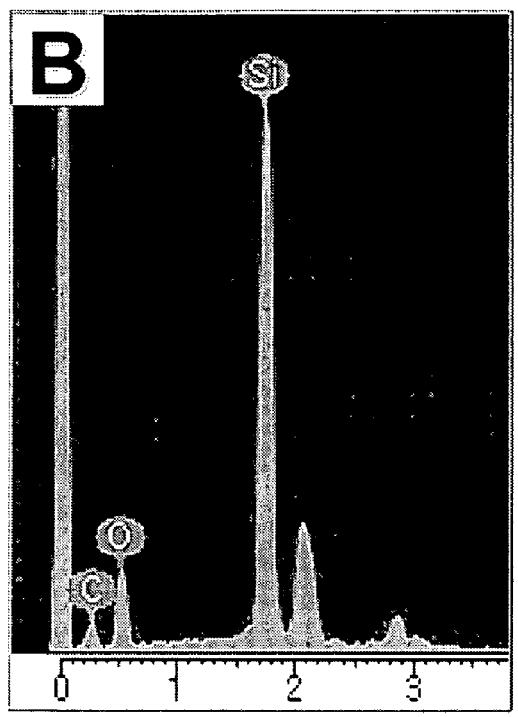
Figure 12D:
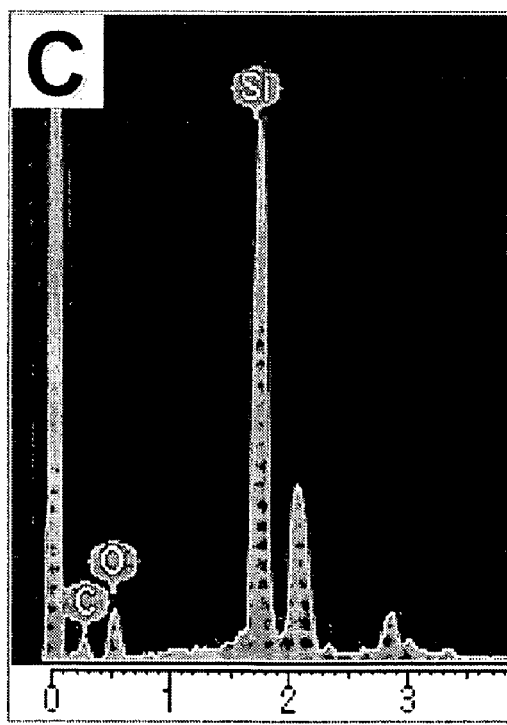

As represented in FIG. 10B, the x-ray diffraction peaks of the arrays (i.e., silicalite-1 supercrystals) appeared at 8.90°, 17.75°, 26.70°, 36.0° and 45.30°, demonstrating that all the crystals were aligned with the a-axis perpendicular to the substrate plate. Thus, the above results show that the orientation of the crystals in the multi-crystal arrays (supercrystals) can also be changed by varying the nature and type of the polymer templates.

EXAMPLE VII

SEM (Scanning Electronic Microscope) Analysis

A platinum/palladium coating with a thickness of about 15 mm was placed on the supercrystals of zeolite or zeotype molecular sieve prepared according to the above-described Examples, from which SEM images were obtained using a SEM (Hitachi S-4300 FE-SEM).

EXAMPLE VIII

XRD (X-Ray Diffraction) Analysis

X-ray diffraction patterns of the supercrystals of zeolite or zeotype molecular sieve prepared according to the above-described Examples were measured on a Rigaku diffractometer D/MAX-1C with Cu $K_\alpha$ radiation by 2θ/θ scanning with the speed of 1° $min^{-1}$.

Having described a preferred embodiment of the present invention, it is to be understood that variants and modifications thereof falling within the spirit of the invention may become apparent to those skilled in this art, and the scope of this invention is to be determined by appended claims and their equivalents.

REFERENCES

1. G. A. Ozin, A. Kuperman, A. Stein, Angew. Chem. Int. Ed. Engl. Adv. Mater. 28, 359 (1989).
2. G. A. Ozin, A. Stein, G. D. Stucky, J. P. Godber, J. Inclusion Phenom. 6, 379 (1990).
3. M. Borja, P. K. Dutta, Nature 362, 43 (1993).
4. M. Sykora, J. R. Kincaid, Nature 387, 162 (1997).
5. Y. Kim et al., J. Phys. Chem. 101, 2491 (1997).
6. D. R. Rolison, C. A. Bessel, Acc. Chem. Res. 33, 737 (2000).
7. N. Herron et al., J. Am. Chem. Soc. 111, 530 (1989).
8. T. Bein, P. Enzel, Angew. Chem. Int. Ed. Engl. 12, 1737 (1989).
9. G. Grubert, M. Stockenhuber, O. P. Tkachenko, M. Wark, Chem. Mater. 14, 2458 (2002).
10. G. Calzaferri et al., J. Mater. Chem. 12, 1 (2002).
11. S. D. Cox, T. E. Gier, G. D. Stucky, J. Bierlein, J. Am. Chem. Soc. 110, 2986 (1988).
12. U. Vietze et al., Phys. Rev. Lett. 81, 4628 (1998).
13. M. E. Davis, Nature 417, 813 (2002).
14. J. S. Park, G. S. Lee, Y.-J. Lee, Y. S. Park, K. B. Yoon, J. Am. Chem. Soc. 124, 13366 (2002).
15. G. S. Lee, Y.-J. Lee, K. B. Yoon, J. Am. Chem. Soc. 123, 9769 (2001).
16. S. Y. Choi, Y.-J. Lee, Y. S. Park, K. Ha, K. B. Yoon, J. Am. Chem. Soc. 122, 5201 (2000).
17. S. Mann, Nature 365, 499 (1993).
18. E. Dujardin, S. Mann, Adv. Eng. Mater. 4, 461 (2002).
19. L. Addadi, S. Weiner, Angew. Chem. Int. Ed. Engl. 31, 153 (1992).
20. S. Weiner, L. Addadi, J. Mater. Chem. 7, 689 (1997).
21. Y.-J. Lee, J. S. Lee, Y. S. Park, K. B. Yoon, Adv. Mater. 13, 1259 (2001).
22. D. L. Pavia, G. M. Lampman, G. S. Kriz, Introduction to spectroscopy (Saunders College Publishing, Orlando, 1996).
23. M. M. J. Treacy, J. B. Higgins, Collection of simulated XRD powder patterns for zeolites (Elsevier, Amsterdam, 2001).
24. C. E. A. Kirschhock, R. Ravishankar, P. A. Jacobs, J. A. Martens, J. Phys. Chem. 103, 11021 (1999).
25. C. E. A. Kirschhock, S. P. B. Kremer, P. J. Grobet, P. A. Jacobs, J. A. Martens, J. Phys. Chem. 106, 4897 (2002).
26. J. H. Koegler, H. van Bekkum, J. C. Jansen, Zeolites 19, 262 (1997).
27. J. Caro et al., Adv. Mater. 4, 273 (1992).
28. S. Feng, T. Bein, Nature 368, 834 (1994).
29. S. Feng, T. Bein, Science 265, 1839 (1994).
30. J. Aizenberg, A. J. Black, G. M. Whitesides, Nature 398, 495 (1999).
31. V. Burtman, A. Zelichenok, S. Yitzchaik, Angew. Chem. Int. Ed. 38, 2041 (1999)

What is claimed is:

1. A method for preparing a uniformly aligned zeolite supercrystal comprising growing a crystal of a zeolite or zeotype material in a uniformly aligned template, whereby said uniformly aligned zeolite supercrystal is prepared;
    wherein said uniformly aligned template is a template of which the molecules are aligned or oriented in one direction,
    said uniformly aligned template is a polymer film or three-dimensional polymer mass capable of releasing an amine group under an acidic or alkaline condition; or a crystal of organic or organometallic compound having functional groups of urethane, urea, ester, amide, amine or imide, and
    said uniformly aligned polymeric template is prepared by polymerization of reactants having three moieties represented by the general formula of E-[C]-E, wherein E represents an end moiety containing at least one functional group and C represents a central moiety.

2. The method according to claim 1, wherein said zeolite or zeotype material is selected from the group consisting of: (i) a zeolite or zeotype material having MFI framework; (ii) a zeolite or zeotype material having MEL framework; (iii) zeolites A, X, Y, L and beta, mordenite and ferrierite; and (iv) a mesoporous silica.

3. A method for preparing a uniformly aligned zeolite supercrystal comprising growing a crystal of a zeolite or zeotype material in a uniformly aligned template, whereby said uniformly aligned zeolite supercrystal is prepared, wherein said uniformly aligned template is prepared by the method comprising the steps of:

(a) injecting a vapor of a first reactant into a reactor containing a substrate to form a covalent bond between a functional group of said first reactant and a functional group on said substrate;

(b) injecting a vapor of a second reactant into said reactor to form a covalent bond between a functional group of said second reactant and a functional group of said first reactant covalently linked to said functional group on said substrate;

(c) when three or more reactants are used, injecting a vapor of a following reactant into said reactor to form a covalent bond between a functional group of said following reactant and a functional group of a previous reactant; and (d) cycling the steps (a)-(c), wherein a functional group of said first reactant is covalently linked to a functional group of a final reactant; and wherein said reactants have three moieties represented by the general formula of E-[C]-E, wherein E represents an end moiety containing at least one functional group and C represents a central moiety.

* * * * *